US006836721B2

(12) United States Patent
Stevens

(10) Patent No.: US 6,836,721 B2
(45) Date of Patent: Dec. 28, 2004

(54) METHOD AND APPARATUS FOR PROVIDING INTERFACE TO ORIGINAL EQUIPMENT ENGINE CONTROL COMPUTER

(76) Inventor: Jeffrey Donald Stevens, 3812 Stone Pointe Way, Pleasanton, CA (US) 94588

( * ) Notice: Subject to any disclaimer, the term of this patent is extended or adjusted under 35 U.S.C. 154(b) by 0 days.

(21) Appl. No.: 10/409,324

(22) Filed: Apr. 7, 2003

(65) Prior Publication Data

US 2003/0195692 A1 Oct. 16, 2003

Related U.S. Application Data

(60) Provisional application No. 60/371,385, filed on Apr. 10, 2002.

(51) Int. Cl.[7] .................. G06F 19/00

(52) U.S. Cl. .................. 701/104; 123/490

(58) Field of Search .................. 701/104, 105; 123/490; 361/152, 154

(56) References Cited

U.S. PATENT DOCUMENTS 4,428,051 A * 1/1984 Kuboki et al. .............. 701/115
4,502,446 A * 3/1985 Kanegae et al. ............ 123/479
4,721,083 A * 1/1988 Hosaka ....................... 477/111
5,363,647 A * 11/1994 Ohuchi et al. ................ 60/276
5,425,234 A * 6/1995 Ohuchi et al. ................ 60/276
5,426,937 A * 6/1995 Ohuchi et al. ................ 60/276
5,438,827 A * 8/1995 Ohuchi et al. ................ 60/276
5,640,846 A * 6/1997 Ohuchi et al. ................ 60/276

* cited by examiner

*Primary Examiner*—John T. Kwon
(74) *Attorney, Agent, or Firm*—Jackson & Co., LLP; Kuni Oh

(57) ABSTRACT

Method and apparatus for retrofitting a low impedance fuel injection system to a high impedance fuel injection system internal combustion engine is disclosed. The original high impedance electronic control system may be retained, while system modification circuitry is added along the fuel injector control path. In one aspect, an original fuel injector control signal is intercepted along the fuel injector control wire. The intercepted signal is then modified from a simple on-off signal to a signal which varies the fuel injector current as a function of time, such that the on-state from the original high impedance system is converted to a current controlled signal. Moreover, using a plurality of parameters, the fuel injector pulsewidth may be modified, as well as the peak and hold current levels provided to the fuel injectors.

32 Claims, 14 Drawing Sheets

METHOD AND APPARATUS FOR PROVIDING INTERFACE TO ORIGINAL EQUIPMENT ENGINE CONTROL COMPUTER

RELATED APPLICATION

This application claims priority under 35 USC §119 to provisional patent application No. 60/371,385 filed on Apr. 10, 2002 entitled "Device That Interfaces an Original Equipment Engine Control Computer to Low-Impedance Fuel Injectors" the disclosure of which is incorporated herein by reference for all purposes.

BACKGROUND OF THE INVENTION

Fuel injectors, which are essentially fuel on/off valves controlled by an electric signal, are available in two broad families characterized by their electrical impedance—low impedance and high impedance. The impedance of a fuel injector dictates how much electric current will flow through it when it is connected across vehicle battery voltage (typically 12 Vdc). Lower impedance results in a larger flow of electric current, and the larger electric current flow in turn provides more force to open the fuel injector. Thus, a low impedance fuel injector has more opening force than a high impedance fuel injector of an equivalent fuel injector flow rate.

Fuel injector flow rate is a measure of the quantity of fuel that can pass through a fully open fuel injector per unit of time, at a specified fuel pressure. The unit of measure commonly used in the United State for fuel injector flow rate is pounds of fuel per hour (lb/hr). The flow rate measurement is typically made at a fuel pressure of 43.5 pounds per square inch (psi). While fuel injector flow rate is a well-characterized parameter, it only applies to a fuel injector that is fully open. The fuel flow rates during the closed-to-open and open-to-closed transitions are generally not specified. In order to optimize engine performance (i.e., minimize emissions and fuel consumption, and maximize the power delivered per unit of fuel consumed), the total amount of fuel delivered during a fuel injector closed-open-closed cycle must be known. As discussed above, while information related to the fuel flow during transitions may not be available, the engine performance may be optimized if the time required for the transitions (i.e., closed-to-open, and open-to-closed) is minimized.

Low-impedance fuel injectors offer two important advantages over the high-impedance fuel injectors installed in most vehicles as original equipment. First, the higher electric current flowing through a low-impedance fuel injector enables it to open more quickly than a high impedance fuel injector of equivalent flow rating, resulting in a more precise control over fuel delivery, especially in situations where fuel demand is low, such as engine idling or driving at moderate speeds. Further, more precise fuel control enables a decrease in vehicle emissions and an increase in fuel efficiency.

Additionally, low-impedance injectors are available in a much wider range of fuel injector flow rates than the range available in high-impedance fuel injector technology. The relatively small electric current flowing through a high impedance injector limits the amount of force available to open it. This force limitation constrains the size of the fluid flow control mechanism inside the high impedance fuel injector which, in turn, constrains the maximum fuel flow rate. By contrast, low impedance fuel injectors offer roughly four times the amount of electric current compared to high impedance fuel injectors, enabling a significantly wider range of fuel flow rates. In fact, the largest readily available low impedance fuel injector has more than three times the flow rate of the largest high impedance fuel injector.

Despite the advantages of the low impedance fuel injectors, high impedance fuel injectors are more commonly used in commercially available vehicles. This is due to the much higher cost for the electronic circuitry used to operate the low impedance fuel injectors. Indeed, low impedance fuel injectors require both more sophisticated control, and higher electric current capacity, than high impedance fuel injectors, which, in turn, translates to higher cost.

As discussed above, a fuel injector is fluid flow control valve that is turned on by applying an electric current through its electric terminals, and turned off by removing the electric current. For many commercially available vehicles, this electric current is controlled by a computer, hereinafter referred to as the Engine Control Computer. The typical installation of fuel injectors on vehicles available, for example, in the United States, has one of the two fuel injector terminals connected to a source of battery voltage (nominally 12 Vdc), and the other fuel injector terminal connected to an Engine Control Computer output terminal.

To open a particular fuel injector, the Engine Control Computer temporarily connects its output terminal for that fuel injector to a battery ground terminal (nominally 0 Vdc). This temporary connection to the ground terminal typically is made inside the Engine Control Computer itself. The temporary connection to the ground terminal enables electric current to flow through the fuel injector, thus causing the fuel injector to open. To close the particular fuel injector, the Engine Control Computer removes the connection to the battery ground terminal for that fuel injector, which stops the flow of electric current through the fuel injector, resulting in the fuel injector closing.

The temporary connection to the battery ground terminal discussed above is generally referred to as a "pulse". Furthermore, the total length of time for the temporary connection to the battery ground terminal is generally referred to as the "pulsewidth". The Engine Control Computer controls the amount of fuel delivered to the engine by the fuel injector through the control of the duration of the pulsewidth. Typically, pulsewidths are in the range of 1.5 millisecond to 20 milliseconds. Also, the pulsewidth must account for the time needed for the fuel injector closed-to-open and open-to-closed transitions, even though the duration of those transitions may not be precisely predictable.

Vehicle manufacturers generally configure their Engine Control Computers to provide fuel injector pulsewidths that are appropriate for the particular engine under the expected range of operating conditions. However, due to manufacturing tolerance variability, the provided pulsewidths may not be suitable for every vehicle in all environmental operating conditions. For example, if the pulsewidths created by the Engine Control Computer are too short, the vehicle engine may not receive sufficient fuel for proper vehicle operation under unusually heavy loads, such as towing a trailer up a long incline, and may be seriously damaged as a result. On the other hand, if the pulsewidths are too long, the engine may receive too much fuel, which will likely result in a decrease in fuel economy and an increase in pollution. Given this, the ability to modify the pulsewidths generated by the Engine Control Computer would allow for optimization of the fuel delivery characteristics of one's vehicle.

High Impedance fuel injectors are very easy to control—this is their primary market advantage. To turn a high impedance fuel injector on, one needs only to connect one fuel injector terminal to a source of battery voltage (nominally 12 Vdc) and the other terminal to battery ground (nominally 0 Vdc). The high electrical impedance of the high impedance fuel injector inherently limits the electric current flowing through the fuel injector, and the circuit that is operating it, to approximately one ampere. This amount of electric current is small enough to prevent the fuel injector from overheating, even if it were to be turned on indefinitely. The one ampere operating current can be controlled by an inexpensive transistor in the Engine Control Computer. Further, to turn a high impedance fuel injector off, one simply opens the connection to one or both of the fuel injector terminals. In most cases, the fuel injector terminal connected to battery ground is the one that is switched on and off to control the fuel injector. The other fuel injector terminal is continuously connected directly to a source of battery voltage. It should be noted that the source of continuous battery voltage is typically controlled by the engine ignition such that battery voltage is applied to the fuel injector only when the engine ignition is on.

As discussed above, the control scheme for a high impedance fuel injector is simply an electrical switch between the one of the fuel injector's electric terminals and battery ground. The Engine Control Computer controls fuel flow through the fuel injector by closing the electric switch. When the Engine Control Computer opens the electric switch, fuel flow through the fuel injector ceases.

Low impedance fuel injectors require a more sophisticated control scheme. This is because their low electric impedance allows much more current to flow when the fuel injector is on. As was the case for the high impedance fuel injector, a low impedance fuel injector is turned on by connecting one of the fuel injector electric terminals to a source of battery voltage (nominally 12 Vdc) and the other terminal to battery ground (nominally 0 Vdc). This causes the electric current through the fuel injector to increase very rapidly, just as it does for the high impedance fuel injector. However, the electrical impedance of the low impedance fuel injector is too small to limit the electric current to a safe level. If the electric current was not controlled in some way, a low impedance fuel injector connected directly to battery voltage and ground would overheat and fail catastrophically in minutes.

Thus, a mechanism or approach to control the maximum current flowing though a low impedance fuel injector is desired. This maximum current, referred to as the "peak" current, is typically on the order of 4 amperes. It is this peak current, which greatly exceeds the current flowing through a high impedance fuel injector, that gives the low impedance fuel injector the added force it needs to open more quickly than a high impedance fuel injector of an equivalent flow rate, and/or to open larger fluid flow control valves than a high impedance fuel injector can operate. However, the peak current may cause a low impedance fuel injector to overheat and fail if it persists for too long. Thus, a further control mechanism or approach is desired to decrease the electric current from the peak value used to open the fuel injector to the smaller amount of current, referred to as the "hold" current, needed to hold it open. This hold current is typically on the order on 1 ampere, the same as the current flowing through a high impedance fuel injector. The peak current is typically allowed to persist for approximately 1 millisecond. The hold current then persists until the Engine Control Computer disconnects the fuel injector from battery ground, causing the fuel injector to close.

In other words, the low impedance fuel injector must be operated using a "peak" and "hold" electric current control scheme. In order to control the amount of electric current flowing through the fuel injector, the current must be measured and the measurement result used to operate a variable electric restriction. This is much more complicated, and thus more expensive, than the simple on/off control scheme required by high impedance fuel injectors. In addition, electric components exposed to the 4 amperes (or possibly more) of electric current must be significantly more robust than components that are only exposed to 1 ampere. This adds more cost to the peak and hold fuel injector control system.

FIGS. 1A–1B are block diagrams illustrating a standard connection of an Engine Control Computer and fuel injectors, and a standard batch-fire connection of the Engine Control Computer and fuel injectors, respectively. Referring now to FIG. 1A, there is shown an Engine Control Computer 101 operatively coupled to a plurality of fuel injectors 102 of a vehicle engine by corresponding respective fuel injector control wires 103. The configuration shown in FIG. 1A typically is provided with the vehicles manufactured after early 1990s. In most mass-marketed automobiles, there is a single fuel injector for each cylinder in the engine. Thus, a 4-cylinder engine typically has four fuel injectors, a 6-cylinder engine typically has six fuel injectors, and so on. Referring again to FIG. 1A, a 4 cylinder Engine Control Computer 101 would correspondingly have four output terminals each coupled to a corresponding one of the fuel injector control wire 103, each separately connected to a respective fuel injectors 102.

Most modern vehicles use a single Engine Control Computer output terminal to control a single fuel injector as shown in FIG. 1A. However, some older vehicles use a simpler scheme in which a single Engine Control Computer output operates two or more fuel injectors simultaneously. This approach, sometimes referred to as "batch fire", as shown in FIG. 1B. Referring now to FIG. 1B, as shown, each fuel injector control wire 104 may be connected to one or more respective fuel injectors 102. For example, as shown in FIG. 1B, each of the fuel injector control wires 104 are connected to the same number of fuel injectors 102.

One advantage of the batch fire configuration is that it includes comparatively includes lower cost electronics. The older, inexpensive Engine Control Computers did not operate fast enough to control one fuel injector per cylinder. Even though batch fire systems do not operate the fuel injector for each cylinder at precisely the right time, their performance was sufficient to meet the emission standards of the time. Referring back to the Figures, the configuration shown in FIG. 1A is typically "sequential" in that the fuel injectors are operated in sequence, at the precise moment in time that the particular cylinder is ready to accept fuel and air. By contrast, the batch fire configuration shown in FIG. 1B may operate one fuel injector in the batch at the right time, while the remaining fuel injectors in the same batch are operated "out of sequence" with respect to their combustion cycle (intake-compression-ignition-exhaust).

The automotive aftermarket offers Engine Control Computers capable of operating low-impedance fuel injectors, but their costs are relatively high, for example, ranging from more than $1,000 to several thousands of dollars. Moreover, while commercial software in the automotive aftermarket is available which would allow the vehicle owner to optimize the fuel injector pulsewidths for his or her particular vehicle, such commercial software is not compatible to the use of low impedance fuel injectors with the original equipment Engine Control Computer.

In view of the foregoing, it would be desirable to have a system and method for retrofitting a low impedance fuel injection system to an internal combustion engine for which the original system was designed with a high impedance fuel injection system.

SUMMARY OF THE INVENTION

In view of the foregoing, in accordance with the various embodiments of the present invention, there is provided a system and method for retrofitting a low impedance fuel injection system to an internal combustion engine such that the original high impedance electronic control system may be retained, while system modification circuitry is added along the fuel injector control path.

Accordingly, in one embodiment, an original fuel injector control signal may be intercepted along the fuel injector control wire. The intercepted signal is then modified from a simple on-off signal to a signal which varies the fuel injector current as a function of time. That is, the on-state from the original high impedance system is converted to a current controlled signal. Moreover, in a further embodiment, there is provided a method for modifying a low-impedance fuel injection control signal which may include the steps of intercepting a fuel injector control signal along the fuel injector control wire, and modifying the fuel injector control signal such that the modified fuel injector control signal is current controlled.

Moreover, a further embodiment may also include the step of voltage level shifting for matching the signal voltage levels of the vehicle's original fuel injector control signal to the signal levels used in the system modification circuitry. Also, there may be provided a mechanism for preventing the original fuel control circuitry and computer system of the vehicle from generating a fuel injector fault code. Additionally, yet a further embodiment may include a bypass mechanism for allowing the original fuel injector control signal to operate the fuel injectors without modification, and a switching mechanism for the vehicle operator to select between the original fuel injector control signal and the modified signal in accordance with the various embodiments of the present invention.

In this manner, in accordance with the various embodiments of the present invention, the method and apparatus for providing the interface unit is configured to modify the fuel injector control wire signal before transmitting the signal to the respective fuel injector. More specifically, in accordance with the embodiments of the present invention, the modifications to the fuel injector wire signal may include three functions. The first function includes converting the fuel injector control wire signal from a simple on/off scheme used with high impedance fuel injectors, to a more sophisticated peak and hold approach for operation of the low impedance fuel injectors. The second function includes providing the user with the capability to modify the fuel injector pulsewidth, for example, by using additive and multiplicative constants. Lastly, the third function related to the modifications of the fuel injector control wire signal in accordance with the embodiments of the present invention include providing the user with the ability to modify the peak and hold current levels supplied to the fuel injectors.

Accordingly, the method and apparatus for providing an interface unit to the original equipment Engine Control Computer in accordance with the various embodiments of the present invention allows a vehicle's original equipment Engine Control Computer to operate low-impedance fuel injectors. In this manner, potential catastrophic failures of the Engine Control Computer and/or the fuel injectors may be avoided when attempting to operate low-impedance fuel injectors with the original equipment Engine Control Computer.

These and other features and advantages of the present invention will be understood upon consideration of the following detailed description of the invention and the accompanying drawings.

DETAILED DESCRIPTION OF THE INVENTION

Figure 2:
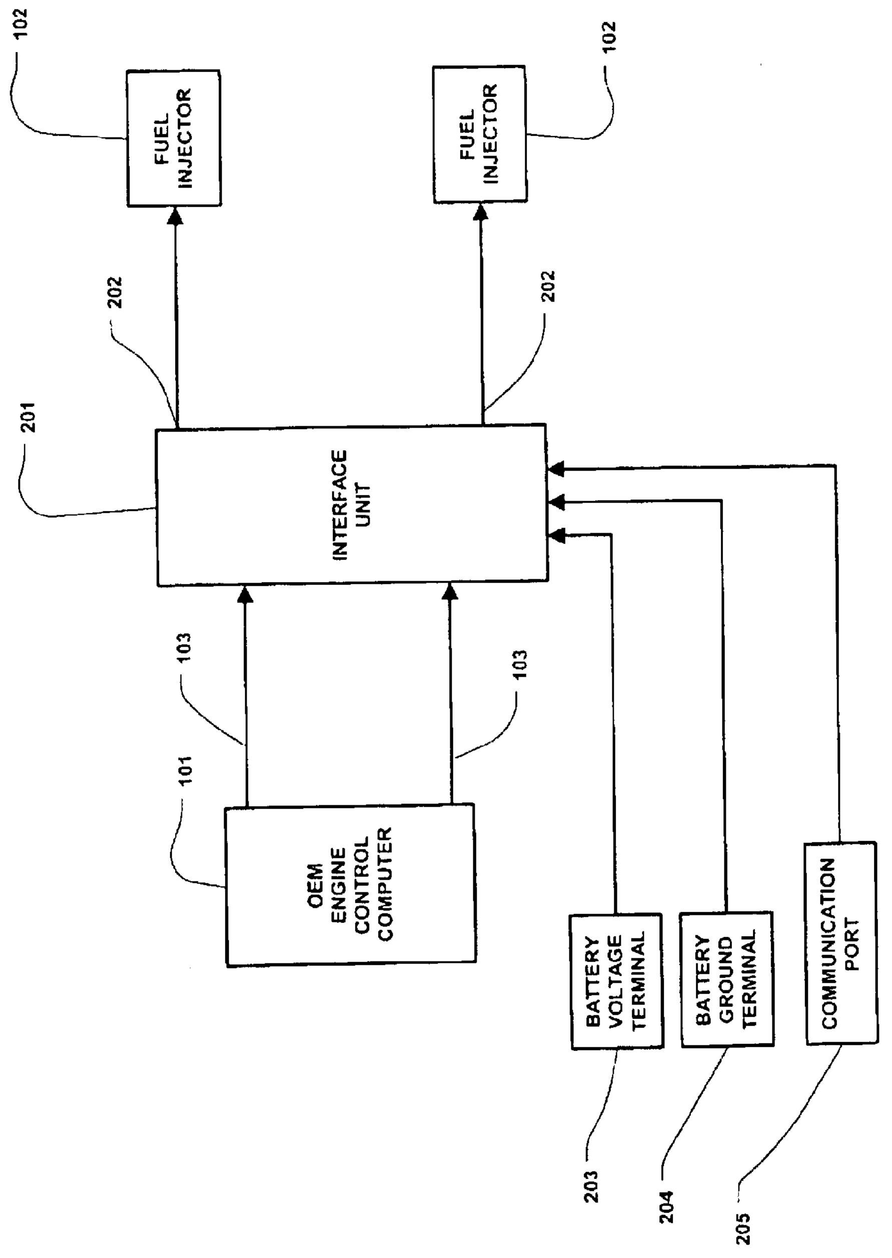
FIG. 2 is a block diagram of the overall system for practicing the present invention in accordance with one embodiment.

FIG. 2 is a block diagram of the overall system for practicing the present invention in accordance with one embodiment. Referring to the Figure, there is provided an interface unit 201 operatively coupled between the Engine Control Computer 101 and the fuel injectors 102. More specifically, each of the fuel injector control wires 103 from the Engine Control Computer 101 are connected to the interface unit 201 input ports, while the output ports of the interface unit 201 are respectively connected to the corresponding fuel injector 102 via the respective interface unit output port 202. Referring back to FIG. 2, also shown are a battery voltage terminal 203, a battery ground terminal 204, and a communication port 205 each connected to the interface unit 201. As will be discussed in further detail below, the communication port 205 is configured to allow data input and output to the interface unit 201 in one embodiment using, for example, a personal computer, a handheld computer, and the like.

In one embodiment, each of the fuel injector control wires 103 originally connecting the Engine Control Computer 101 to the fuel injectors 102 is severed, and the interface unit 201 is placed between the Engine Control Computer 101 and the fuel injectors 102 such that the severed fuel injector control wires 103 from the Engine Control Computer 101 are connected to the respective input ports of the interface unit 201, while the output ports 202 of the interface unit 201 are connected to the respective severed fuel injector control wires 103.

Figure 3:
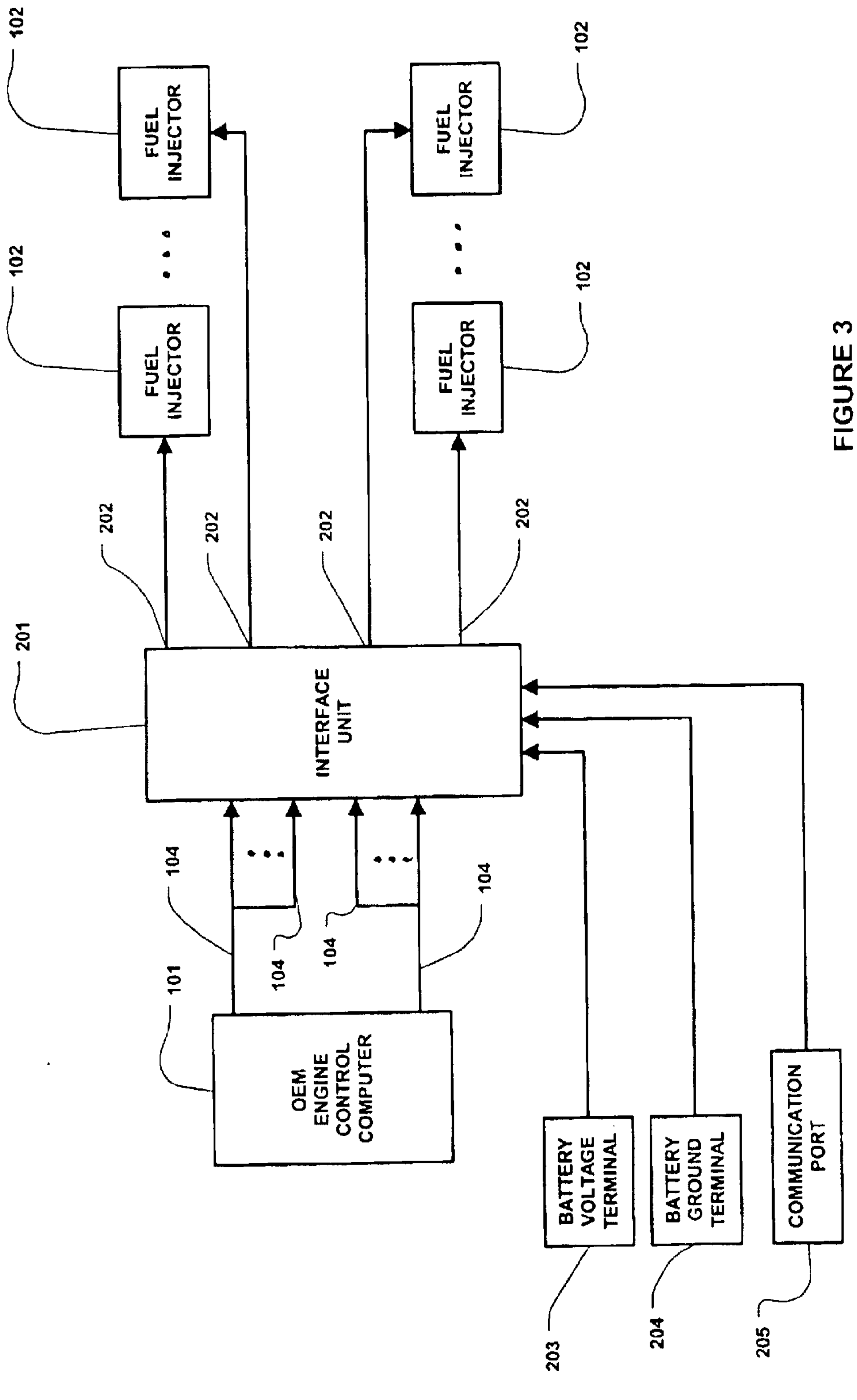
FIG. 3 is a block diagram of the overall system for practicing the present invention in a batch-fire configuration in accordance with another embodiment.

FIG. 3 is a block diagram of the overall system for practicing the present invention in a batch-fire configuration in accordance with another embodiment. Referring to the Figure, compared to the configuration shown in FIG. 2, the connections shown in FIG. 3 show each of the fuel injector control wires 104 connected to multiple input ports of the interface unit 201 in parallel. In one embodiment, the number of input ports of the interface unit 201 for the batch-fire configuration for each fuel injector control wire 104 may equal to the number of fuel injectors 102 controlled by each fuel injector control wire 104. Additionally, it can be seen from FIG. 3 that each fuel injector 102 is connected to a single output port 202 of the interface unit 201, and further, the interface unit 201 is configured such that each separate fuel injector control wire 104 controls the same set of fuel injectors 102 as when the Engine Control Computer 101 was directly connected to the fuel injectors 102.

Figure 4:
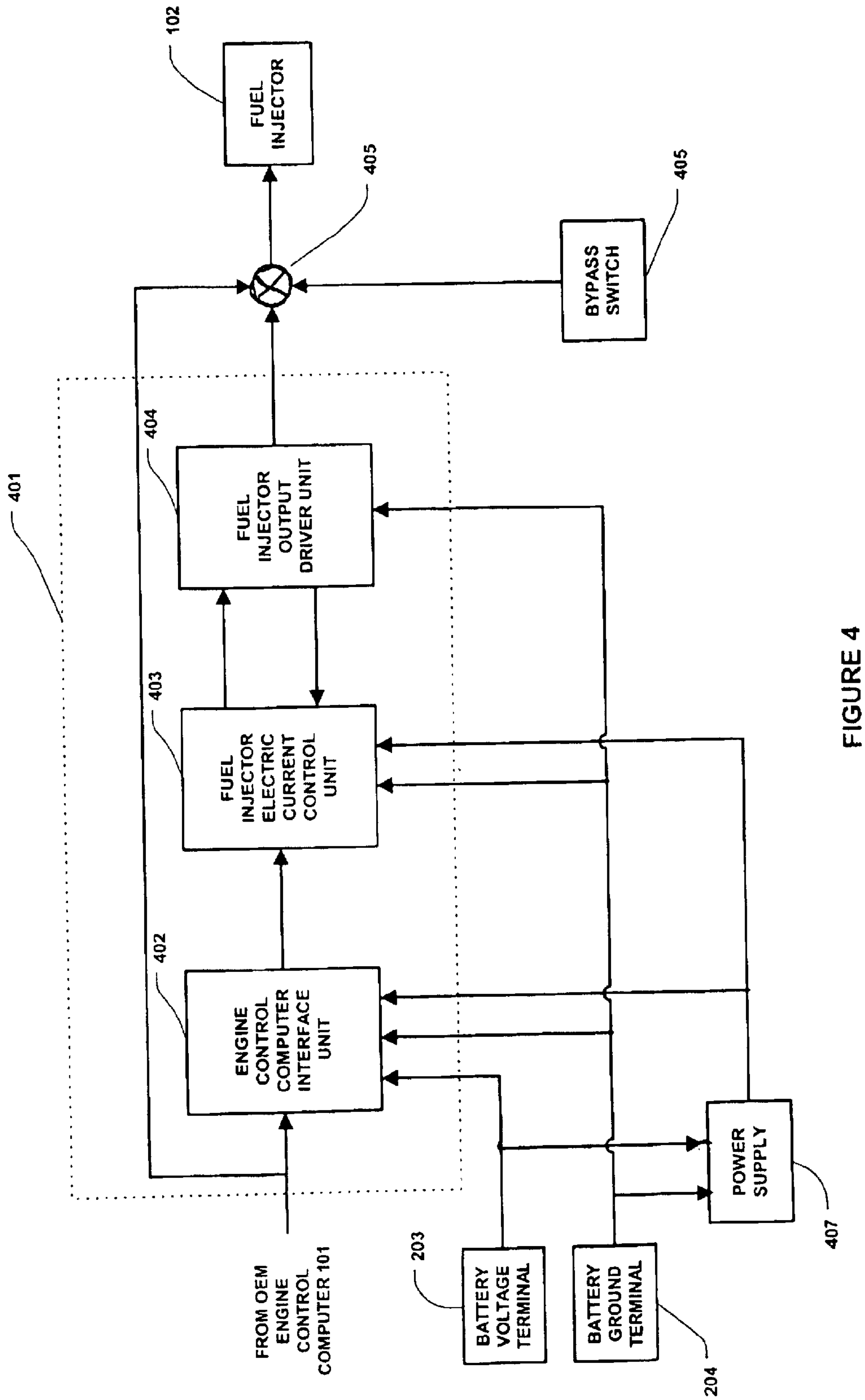
FIG. 4 is a block diagram illustrating a single channel in the interface unit of FIGS. 2 and 3 in accordance with one embodiment of the present invention.

FIG. 4 is a block diagram illustrating one signal path/channel in the interface unit 201 of FIGS. 2 and 3 in accordance with one embodiment of the present invention. It should be noted that within the scope of the present invention, the interface unit 201 includes a separate signal channel 401 for each fuel injector 102 to be controlled, where each channel 401 of the interface unit 201 includes an engine control computer interface unit 402, a fuel injector electric current control unit 403, and a fuel injector output driver 404.

Furthermore, a power supply 407 may be provided to power each of the engine control computer interface unit 402, the fuel injector electric current control unit 403, and the fuel injector output driver unit 404. Moreover, as shown in the Figure, the power supply 407 is further operatively coupled to the battery voltage terminal 203 and the battery ground terminal 204 configured to receive power therefrom. For example, in one embodiment, the power supply 407 may include a 5 volt voltage regulator. Moreover, as discussed in further detail below, in one embodiment, a bypass switch 405 operatively coupled to a multiplexer 406 may be provided to allow switching between a high impedance fuel injector system (i.e., bypassing the interface unit 401), and a low impedance fuel injector system (thus enabling the interface unit 401).

Referring to FIG. 4, the engine control computer interface unit 402 is operatively coupled to the Engine Control Computer 101 (not shown) via the fuel injector control wire 103, as well as to the power supply 407, battery voltage terminal 203 and the battery ground terminal 204. As can be further seen from the Figure, the power supply 407 and the battery ground terminal 204 are each further coupled to the fuel injector electric current control unit 403, while the battery ground terminal 204 is further coupled to the fuel injector output driver unit 404. Moreover, it can be seen that the output of the engine control computer interface unit 402 is provided to the fuel injector electric current control unit 403, while a feedback path is provided between the fuel injector electric current control unit 403 and the fuel injector output driver unit 404. Additionally, the output of the fuel injector output driver 404 is provided to the output port 202 of the interface unit 201 to be provided to the respectively coupled fuel injector 102.

In accordance with one embodiment, the engine control computer interface unit 402 is configured to provide voltage level shifting to match the signal levels within the interface unit 201 to the signal levels sent by the Engine Control Computer 101. Moreover, the engine control computer interface unit 402 may also be configured to provide an electrical pull-up function for the fuel injector control wire 103, to prevent the Engine Control Computer 101 open circuit detection function from generating a fuel injector fault code as discussed in further detail below.

Referring back to FIGS. 1A–1B, one of the two terminals of the fuel injector 102 is connected to a source of battery voltage (not shown) and the other terminal is connected to the fuel injector control wire 103, 104. The Engine Control Computer 101 causes the fuel injector 102 to open by temporarily connecting the fuel injector control wire 103, 104 to the battery ground terminal (not shown). This temporary connection to the battery ground terminal causes the voltage on the fuel injector control wire 103, 104 to be approximately equal to the voltage of the battery ground terminal (nominally 0 Vdc). Further, the Engine Control Computer 101 causes the fuel injector 102 to close by disconnecting the fuel injector control wire 103, 104 from the battery ground terminal. This results in the voltage of the fuel injector control wire 103 to rise a level which approximately equals to the voltage of the battery voltage terminal (nominally 12 Vdc).

The voltage rise from approximately 0 Vdc while the fuel injector 102 is open, to approximately 12 Vdc is a result of the "pull-up" function provided by the fuel injector 102. When the temporary connection to battery ground terminal is removed by the Engine Control Computer 101, no additional current flows through the fuel injector 102, and thus the terminals of the fuel injector 102 are at approximately equal voltage (i.e., unbiased state). The Engine Control Computer 101 includes an option to monitor the voltage of the fuel injector control wires 103, 104. If a fuel injector control wire 103, 104 is removed from the respective connected fuel injector 102, the pull-up function of the fuel injector 102 is no longer available, such that the voltage of the fuel injector control wire 103, 104 may not be approximately equal to the battery voltage. Accordingly, the monitor function of the Engine Control Computer 101 is configured to detect this condition and to notify the vehicle operator of a fuel injection system failure. As discussed in further detail below, the pull-up function of the interface unit 201 in accordance with one embodiment of the present invention is configured to replace the pull-up function provided by the fuel injector 102 and to prevent the Engine Control Computer 101 from detecting a failure condition when the interface unit 201 is connected.

Figure 1A:
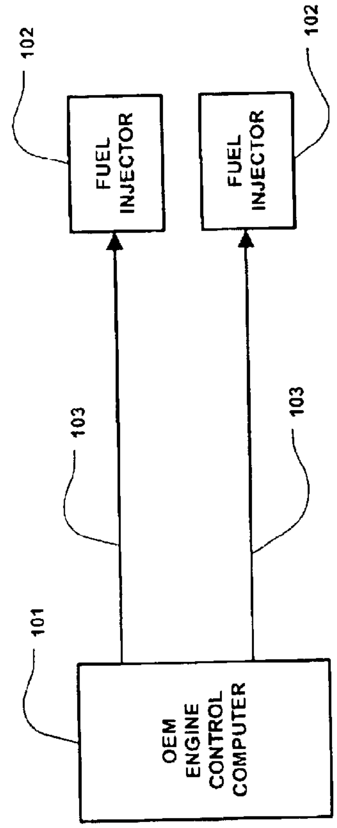
FIGS. 1A–1B are block diagrams illustrating a standard connection of an Engine Control Computer and fuel injectors, and a standard batch-fire connection of the Engine Control Computer and fuel injectors, respectively.
Figure 1B:
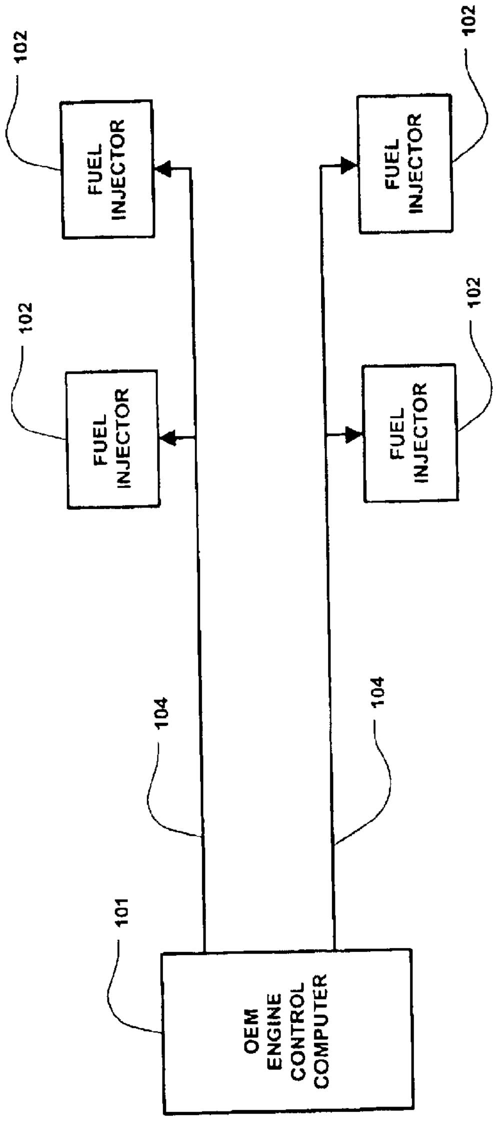

As can be seen from FIGS. 1A–1B, the voltage signal of the fuel injector control wire 103 is approximately equal to the battery voltage (not shown) when the fuel injector 102 is closed, and also, approximately equal to battery ground when the fuel injector 102 is open—in other words, providing an "active low" control scheme where the function is active (i.e., fuel injector 102 is open) when the voltage is low, and inactive (i.e., fuel injector closed) when the voltage is high. Referring back to FIG. 4, in accordance with one embodiment, the engine control computer interface unit 402 may be configured to invert the active low control scheme such that the signal transmitted to the fuel injector electric current control unit 403 is set up as an "active high" control scheme, where an active high signal is active (i.e., the fuel injector 102 is open) when the voltage is high, and where inactive (i.e., the fuel injector 102 is closed) when the voltage is low.

Moreover, as discussed above, the fuel injector control wire signal varies between two voltage states—the battery voltage (nominally 12 Vdc) and the battery ground (nominally 0 Vdc). In one embodiment, the fuel injector electric current control unit 403 may be configured to operate over a narrower voltage range of approximately 5 Vdc to 0 Vdc. This narrower range allows for the use of commercially available and inexpensive components to implement the design of the fuel injector current electric control unit 403. For example, in one embodiment, the fuel injector electric current control unit 403 may include a LM1949 integrated circuit available from National Semiconductor Corporation. Accordingly, in one embodiment, the engine control computer interface unit 402 is configured to perform voltage conversion from the 12 Vdc to 0 Vdc range of the fuel injector control wire 103, 104 to the 5 Vdc to 0 Vdc range tolerated by the fuel injector electric current control 403.

Figure 5A:
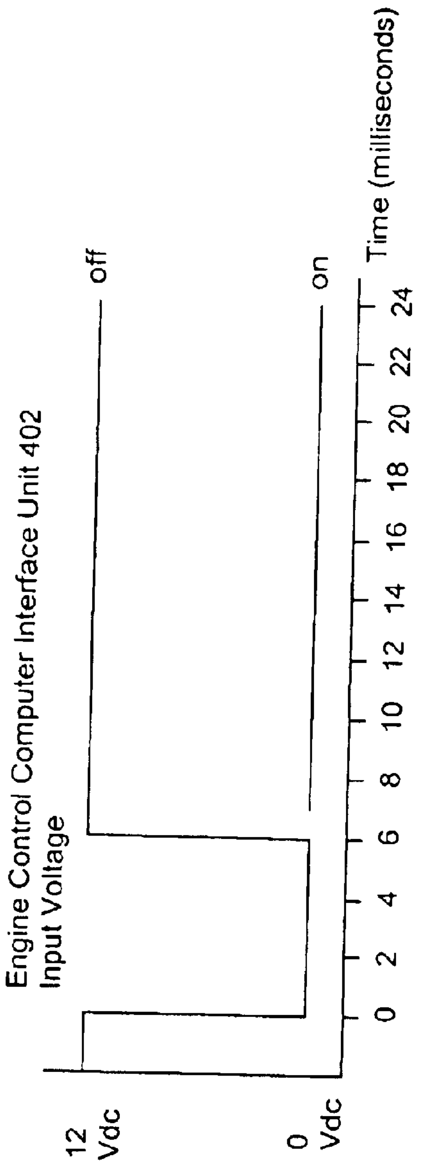
FIGS. 5A–5B illustrate voltage and logic conversion functions at the input and output terminals, respectively, of the engine control computer interface unit of the interface unit of FIG. 4.
Figure 5B:
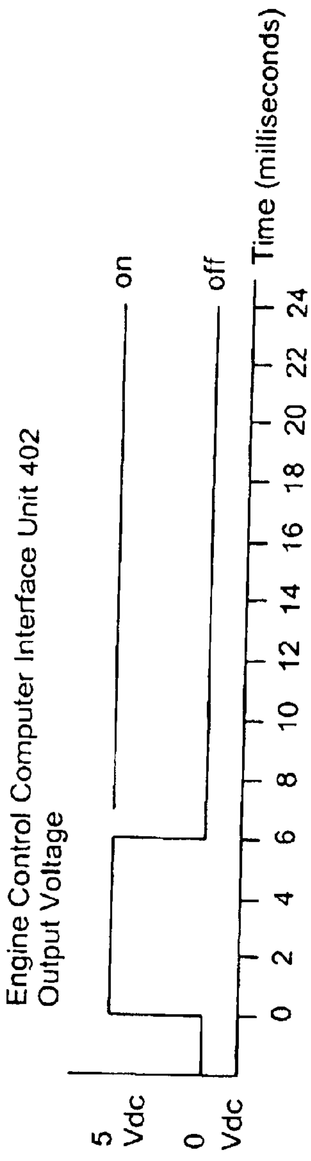

FIGS. 5A–5B graphically illustrate voltage and logic conversion states provided by the engine control computer interface unit 402 of the interface unit of FIG. 4 in accordance with one embodiment of the present invention. As can be seen, given the active low signal from the fuel injector control wire 103, 104 having a pulsewidth of 6 milliseconds and a range of 12 Volts to 0 Volts (FIG. 5A), the engine control computer interface unit 402 (FIG. 4) in one embodiment is configured to generate an active high output signal of the same pulsewidth, but with a voltage range of 0 Volts to 5 Volts (FIG. 5B). The voltage converted signal from the engine control computer interface unit 402 is then provided to the fuel injector electric current control unit 403 (FIG. 4).

Referring back to FIG. 4, the fuel injector electric current control unit 403 in one embodiment of the present invention is configured to convert the on-and-off fuel injector control signal from the Engine Control Computer 101 into a more sophisticated signal that algorithmically varies the fuel injector current over time as discussed in further detail below. More specifically, the Engine Control Computer 101 causes a fuel injector 102 to open by temporarily connecting one of the fuel injector terminals to the battery ground terminal 204 which, in turn, causes a voltage transition in the fuel injector control wire 103 from the voltage of the battery voltage terminal 203 (nominally 12 Vdc) to the voltage of the battery ground terminal 204 (nominally 0 Vdc). As discussed above, the engine control computer interface unit 402 is configured to convert the 12 Vdc to 0 Vdc transition to a 0 Vdc to 5 Vdc transition, which is then transmitted to the fuel injector electric current control unit 403.

Referring yet again to FIG. 4, in one aspect of the present invention, in response to the 0 Vdc to 5 Vdc transition at its input, the fuel injector electric current control unit 403 is configured to transmit an output driver control signal to the fuel injector output driver unit 404 causing the fuel injector output driver unit 404 to temporarily connect the fuel injector terminal to battery ground terminal 204. This results in full battery voltage being applied across the terminals of the fuel injector 102, causing in a rapid increase in electric current through the fuel injector 102. It should be noted that the rate of increase of the electric current is a function of the particular fuel injector impedance value and the available battery voltage.

Additionally, in one embodiment, the fuel injector electric current control unit 403 uses the output driver feedback signal received from the fuel injector output driver 404, to continuously measure the electric current flowing through the fuel injector 102. When the fuel injector current rises to the maximum value within the allowable current range (i.e., the "peak" current), the fuel injector electric current control unit 403 transmits an output driver control signal to the fuel injector output driver unit 404, causing the fuel injector output driver unit 404 to begin increasing the voltage at the terminal of the fuel injector 102 above the voltage level of the battery ground terminal 204. This results in a decrease in the voltage across the terminals of the fuel injector 102, which, in turn, causes the electric current through the fuel injector 102 to decrease.

When the measured level of the output driver feedback signal received by the fuel injector electric current control unit 403 indicates that the electric current of the fuel injector 102 has decreased to a value that can be maintained for the rest of the open time of the fuel injector 102 without causing the fuel injector 102 to overheat (i.e. the "hold" current), the fuel injector electric current control unit 403 transmits an output driver control signal to the fuel injector output driver unit 404, causing the fuel injector output driver unit 404 to maintain that electric current value for the remainder of the open time of the fuel injector 102.

As discussed above, the Engine Control Computer 101 is configured to close the fuel injector 102 by disconnecting the terminal of the fuel injector 102 from battery ground terminal 204 which, in turn, causes a voltage transition in the fuel injector control wire 103 from the voltage of the battery ground terminal 204 (nominally 0 Vdc) to the voltage of the battery voltage terminal 203 (nominally 12 Vdc). Moreover, as further discussed above, the engine control computer interface unit 402 in one embodiment is configured to translate the 0 Vdc to 12 Vdc transition to a 5 Vdc to 0 Vdc transition which is then transmitted to the fuel injector electric current control unit 403. Upon receiving the 5 Vdc to 0 Vdc transition at its input terminal, the fuel injector electric current control unit 403 in one embodiment is configured to transmit an output driver control signal to the fuel injector output driver unit 404 to completely disconnect the terminal of the fuel injector 102 from the battery ground terminal 204. This, in turn, drives the electric current through the terminals of the fuel injector 102 down to zero amperes which, in turn, causes the fuel injector 102 to close.

Further, upon receiving the output driver control signal from the fuel injector electric current control unit 403, the fuel injector output driver unit 404 in one embodiment is configured to adjust the electric current flowing through the fuel injector 102 by controlling the voltage level at the terminal of the fuel injector 102. In other words, if the voltage at the terminal of the fuel injector 102 is approximately at the voltage of the battery ground terminal 203, the electric current flow through the fuel injector 102 will substantially be at its maximum value. On other hand, if the voltage level at the terminal of the fuel injector 102 is approximately at the voltage level of the battery voltage terminal 204, the electric current through the fuel injector 102 will substantially be at zero amperes. Between this current range, the current level of the fuel injector 102 is configured to vary by actively adjusting the voltage across the terminals of the fuel injector 102.

In this manner, the fuel injector output driver unit 404 in one embodiment may be configured to modulate several amperes of electric current without overheating, that is, the fuel injector output driver unit 404 is sufficiently robust to tolerate several amperes of current. In this manner, the electric "valve" embodied, for example, as the fuel injector output driver unit 404 shown in the Figure and configured to be operated by the fuel injector electric current control unit 403 may be electrically connected to the fuel injector 102. Furthermore, the fuel injector output driver unit 404 is configured to provide a voltage feedback signal to the fuel injector electric current control unit 403 which is proportional to the electric current flowing through the fuel injector 102.

Additionally, the fuel injector output driver unit 404 may be configured to protect its electric "valve" from excessive voltage excursions that occur when the temporary connection of the fuel injector 102 to battery ground terminal 204 is abruptly disconnected. That is, the opening force in a fuel injector comes from the electric current flowing through a coil of wire (for example, the electric solenoid) inside the fuel injector. One characteristic of a wire coil is that the current flowing through the coil can not change instantaneously. Thus, this inability of the electric current flowing through the fuel injector wire coil to stop abruptly causes a momentary voltage increase at the fuel injector terminal connected to the interface unit 201 (FIG. 2). This momentary voltage increase may easily reach values that are several times the nominal battery voltage. Even though these are brief excursions, their magnitude can be large enough to damage the electric "valve" in the fuel injector output driver unit 404. Thus, the fuel injector output driver unit 404 in one embodiment may include a function to protect the electric "valve" from these momentary voltage excursions.

Figure 8:
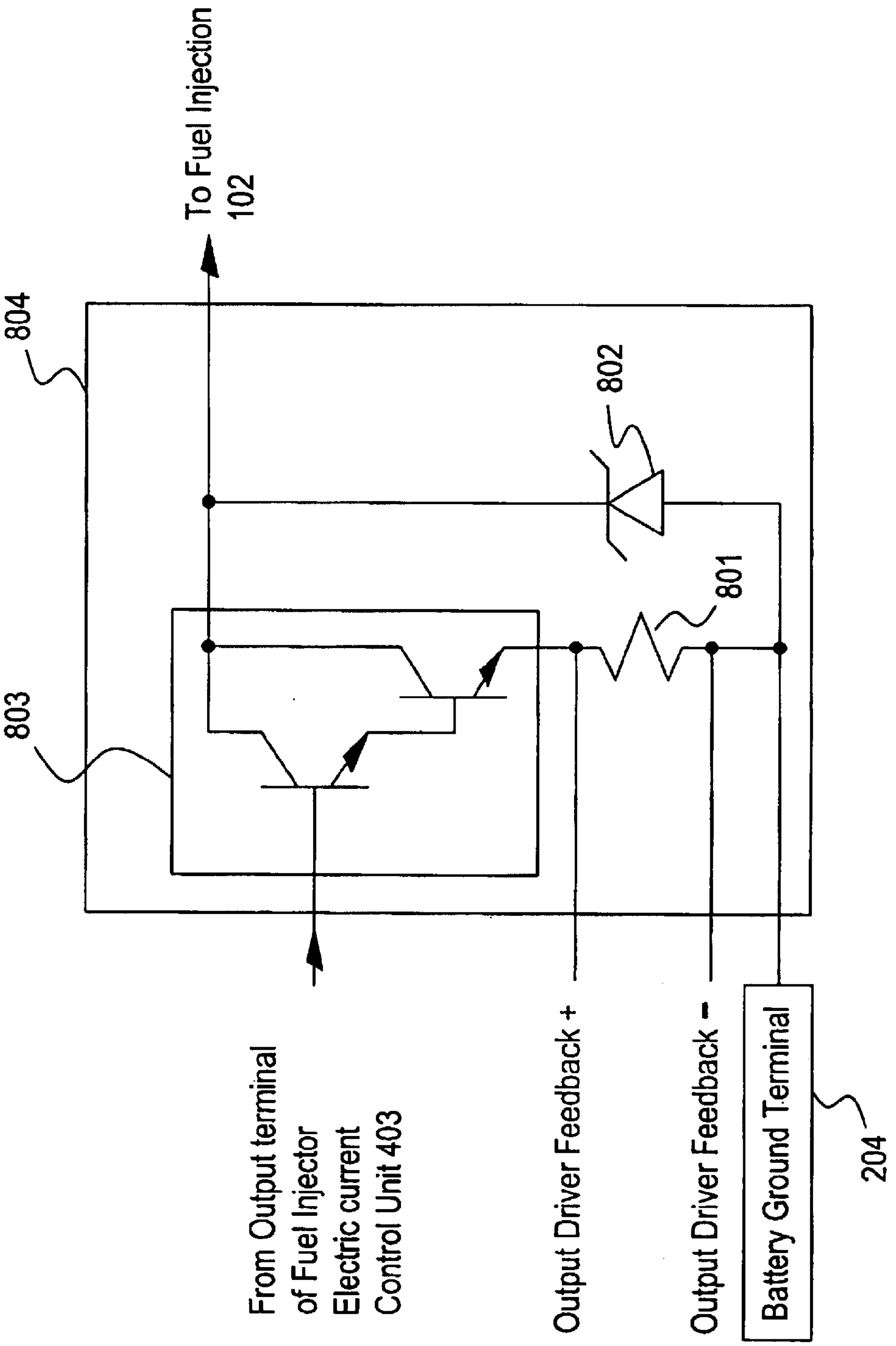
FIG. 8 illustrates the fuel injector output driver unit of the interface unit shown in FIG. 4 in accordance with one embodiment of the present invention.

For example, referring to FIG. 8, a zener diode 802 as shown is configured as an electric switch that opens when a predetermined voltage (i.e., the zener voltage) is reached across its two terminals. As can be seen, one terminal of the diode 802 is coupled to the output terminal of the fuel injector electric current control unit 403 and configured to receive the driver control signal therefrom, while the other terminal of the diode is coupled to the battery ground terminal 204. When the voltage of the output driver control signal reaches the predetermined voltage (for example, the zener voltage) of the diode 802, the diode 802 operating as a switch is configured to open and to shunt (i.e., conduct) the current that is causing the voltage increase to the battery ground terminal 204. This action rapidly decreases the voltage of the output driver control signal to zero. In one embodiment, the diode 802 may include a 33 volt zener diode which would require the output driver voltage to reach 33 Vdc before the diode 802 is configured to open.

Referring back to FIG. 4, the bypass switch 405 and the multiplexer 406 as shown in the Figure in one embodiment are provided to allow the user to switch between the original fuel injector control signal (from the Engine Control Computer 101) and the current controlled fuel injector control signal generated via the interface unit 401 to control the operation of the fuel injectors 102. More specifically, the multiplexer 406 may, in one embodiment, include a 2-channel analog multiplexer which uses an electric control signal to route one of its two inputs to its output, thus providing a 2-channel switch function. In a further embodiment, the multiplexer 406 may include a plurality of 2-channel switch functions in a single physical package, with all of the 2-channel switch functions controlled by a common control input. For example, if a particular analog multiplexer integrated circuit has 8 instantiations of the 2-channel switch function, all of the instantiations would respond identically and simultaneously to the state of the electric control signal.

The electric control signal for the 2-channel switch function discussed above in one embodiment may include two operating states. More specifically, in one embodiment, the voltage associated with one of these two states may approximately equal to the supply voltage (e.g. 5 Vdc) for the 2-channel multiplexer 406, while the other state may approximately equal to the ground voltage (e.g. 0 Vdc). One implementation of the bypass switch 405 and the multiplexer 406 may include connecting one input of each of the 2-channel switch functions inside the analog multiplexer to the fuel injector control wire 103 from the Engine Control Computer 101. The other input of each of the 2-channel switch functions inside the analog multiplexer may be connected to the signal from the output driver 803. The respective output of each of the 2-channel switch functions inside the analog multiplexer may be connected to the respective fuel injector 102.

In one embodiment, the bypass switch 405 connected to the multiplexer 406 may include a SPDT (single-pole-double-throw) bypass switch 405 physically located such that it can be operated by the user. More specifically, the bypass switch 405 may be operatively coupled such that, when it is in one of its two positions (each corresponding to a respective one of the two states discussed above), the control signal to the control input of the multiplexer 406 is 5 Vdc, while when it's in the other position, the control signal to the control input of the multiplexer 406 is 0 Vdc. In this manner, in one embodiment, the user may easily connect the engine's fuel injectors 102 to either the high impedance fuel injector signal coming directly from the Engine Control Computer 101, or the low impedance fuel injector signal of the interface unit 401 without the need to change any wiring, and without the need to modify the settings via data input through the serial communication port 205.

Figure 6:
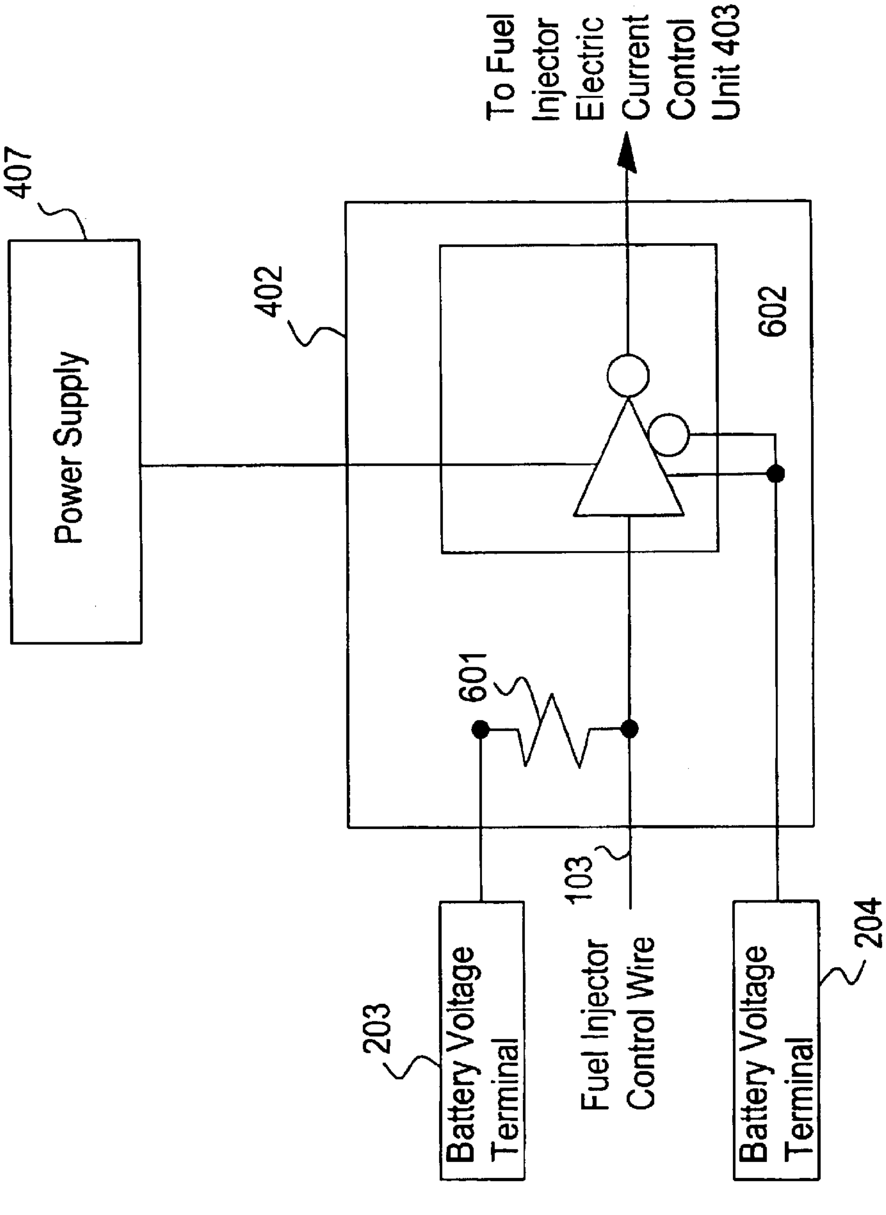
FIG. 6 illustrates the engine control computer interface unit of the interface unit shown in FIG. 4 in accordance with one embodiment of the present invention.

FIG. 6 illustrates the engine control computer interface unit 402 of one separate signal channel 401 of the interface unit 201 shown in FIG. 4 in accordance with one embodiment of the present invention. Referring to the Figure, in one embodiment, the engine control computer interface unit 402 includes a pull-up resistor 601 coupled between the battery voltage terminal 203 and the fuel injector control wire 103. As can be further seen from the Figure, the fuel injector control wire 103 is operatively coupled to the non-inverting input terminal of an inverting buffer unit 602. Additionally, the battery ground terminal 204 is operatively coupled to the output enable input terminal of the inverting buffer unit 602. Furthermore, the power supply 407 (FIG. 4) is operatively coupled to a power input terminal of the inverting buffer unit 602 and configured to provide power to the inverting buffer unit 602. Moreover, as can be further seen from FIG. 6, the battery ground terminal 204 is additionally operatively coupled to a ground input terminal of the inverting buffer unit 602.

In one embodiment, the pull-up resistor 601 may include a 1,000 Ohm resistor, while the inverting buffer unit 602 may include, for example, a 74HCT540 octal inverting buffer. The inverting output terminal of the inverting buffer unit 602 is operatively coupled to the input terminal of the fuel injector electric current control unit 403 in the interface unit 401.

In one embodiment, the pull-up resistor 601 is configured to substantially prevent the Engine Control Computer 101 (FIG. 1) from erroneously detecting an open circuit condition and issuing an error code to the vehicle operator. Furthermore, the logic inversion of the inverting buffer unit 602 is configured to convert the active-low Engine Control Computer output to an active-high input for the fuel injector electric current control unit 403. That is, the Engine Control Computer 101 is configured to open a fuel injector by momentarily connecting the fuel injector control wire 103 for that fuel injector 102 to the battery ground terminal 204. This causes the voltage at the input to the inverting buffer unit 602 to transition from the voltage of the battery voltage terminal 203 (nominally +12 Volts) to the voltage of the battery ground terminal 204 (nominally 0 Volts). in one embodiment, the inverting buffer unit 602 is then configured to invert this high-to-low transition to a low-to-high transition output signal to be provided to the fuel injector electric current control unit 403. Moreover, the inverting buffer unit 602 is also configured to convert the nominally 12 Vdc voltage swing of the fuel injector control wire 103 to a 5 Vdc (nominal) voltage swing for the output signal (e.g., translated control voltage signal) from the engine control computer interface unit 402.

On the other hand, in the case when the Engine Control Computer 101 is configured to close the fuel injector 102 by disconnecting the fuel injector control wire 103 for that fuel injector 102 from the battery ground terminal 204, since the fuel injector control wire 103 is no longer connected to any voltage source, the wire voltage may drift to any value between the voltages of the battery voltage terminal 203 and the battery ground terminal 204—that is, the wire voltage is said to "float". In this case, the pull-up resistor 601 of the engine control computer unit 402 may be configured to cause the voltage on the Fuel Injector Control Wire 103 to rise to the voltage of the battery voltage terminal 203 (nominally +12 Vdc) when the Engine Control Computer 101 disconnects the fuel injector control wire 103 from the battery ground terminal 204. This low-to-high voltage transition is inverted by the inverting buffer unit 602, resulting in a high-to-low transition output signal of the engine control computer interface unit 402 and provided to the fuel injector electric current control unit 403 of the interface unit 401.

Figure 7:
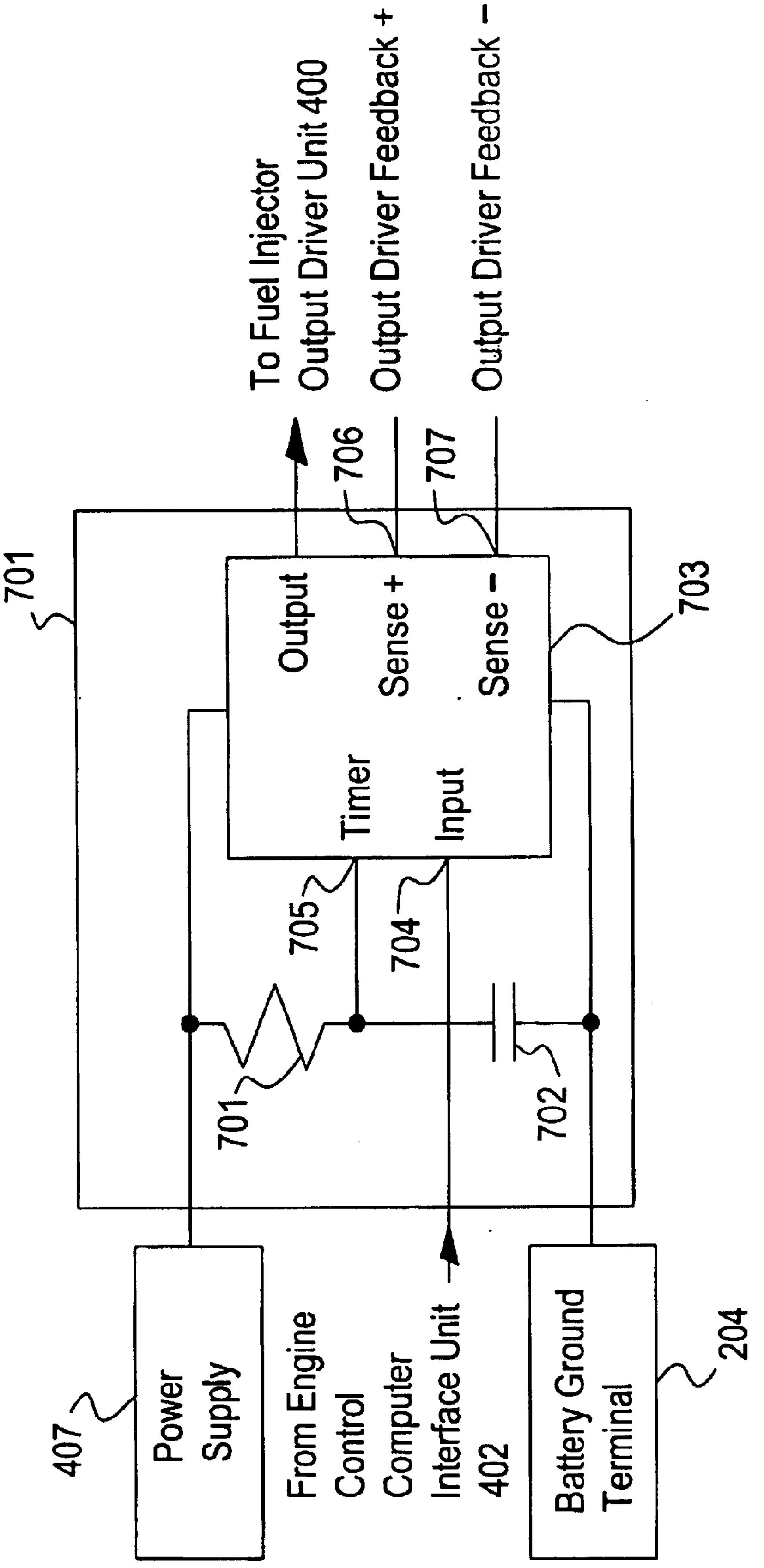
FIG. 7 illustrates the fuel injector electric current control unit of the interface unit shown in FIG. 4 in accordance with one embodiment of the present invention.

FIG. 7 illustrates the fuel injector electric current control unit 403 of the interface unit shown in FIG. 4 in accordance with one embodiment of the present invention. Referring to the Figure, there is provided a plurality of passive components including a resistor 701 and a capacitor 702 connected in series and operatively coupled between the power supply 407 and the battery ground terminal 204. The input terminal 704 of the drive controller 703 is configured to receive the translated control voltage signals from the engine control computer interface unit 402, while the timer terminal 705, as shown in the Figure, is operatively coupled between the resistor 701 and the capacitor 702. In one embodiment, the drive controller 703 includes LM1949 integrated circuit available from National Semiconductor Corporation of Santa Clara, Calif.

Referring back to FIG. 7, the drive controller 703 in one embodiment is configured to responds to a low-to-high voltage transition input at the input terminal 704 by rapidly increasing the current flow in the fuel injector control signal provided to the output driver 803 (FIG. 8) in the fuel injector output driver unit 404. This rapidly increasing fuel injector control signal is configured to turn the fuel injector output driver unit 404 completely on, which enables current flow to increase through the fuel injector 102 as well as through the fuel injector output driver unit 404 (FIG. 4), and the sense resistor 801 (FIG. 8) in the fuel injector driver unit 404 as discussed in further detail in conjunction with FIG. 8. It should be noted that the rate of increase of the current flow is substantially determined by the fuel injector impedance and the voltage level of the battery voltage terminal 203.

Briefly, in one embodiment, the voltage across the sense resistor 801 (FIG. 8) in the fuel injector output driver unit 404 is configured to increase proportionally to the current flowing therethrough. The drive controller 703 may be configured to detect the voltage across the sense resistor 801 and to compare the detected voltage to a fixed threshold value (for example, 0.4 Volts). For example, in one embodiment, a 0.10 ohm sense resistor 801 results in a maximum ("peak") current allowed through the fuel injector 102 of 0.4 volts/0.1 ohm=4.0 amperes. This maximum current value is consistent with the current ratings of typical low impedance fuel injectors, and is sufficient to open the fuel injector 102.

Once the maximum ("peak") current condition is detected, the drive controller 703 may be configured to actively decrease the current in the, fuel injector control signal sent to the output driver 803 which, in turn, causes the output driver 803 to decrease the current flowing through the fuel injectors 102. That is, the drive controller 703 of the fuel injector electric current control unit 403 in one embodiment is configured to control the output driver 804 of the fuel injector output driver unit 404 by controlling the current level of the output driver control signal output from the fuel injector electric current control unit 403 to the fuel injector output driver unit 404.

For example, by increasing the current level of the output driver control signal, the output driver 803 of the fuel injector output driver unit 404 is turned "more on" thus increasing the current flow through the corresponding fuel injector 102. On the other hand, by decreasing the current level in the output driver control signal from the fuel injector electric current control unit 403, the output driver 803 of the fuel injector output driver unit 404 is turned "more off" thus decreasing the current flow through the corresponding fuel injector 102. Indeed, in one embodiment, the output driver 803 of the fuel injector output driver unit 404 is configured to operate as an amplifier which converts the small current in the output driver control signal received from the fuel injector electric current control unit 403, into a larger current provided to the corresponding fuel injector 102.

It should be noted that the decreasing current through the fuel injector 102 results in a concomitant decrease in the current through the sense resistor 801, and thus the voltage across the sensor resistor 801, also decreases. The drive controller 703 may then be configured to measure again the voltage across the sense resistor 801, and to compare the measured voltage to a different fixed predetermined threshold level for the "hold" current of, for example, 0.1 volt. The fuel injector current corresponding to the predetermined 0.1 volt threshold level is determined by: 0.1 volt divided by 0.1 ohm equals 1.0 ampere.

Referring back to FIG. 7, when the 0.1 volt hold current threshold is reached, the drive controller 703 is configured to actively control (i.e., modulate) the supply current in the fuel injector control signal transmitted to the output driver 803 in order to maintain the current through the fuel injector 102 at 1.0 ampere. In one embodiment, 1.0 ampere is substantially sufficient to hold the fuel injector 102 open.

Referring yet again to FIG. 7, recall that the input terminal 704 of the drive controller 703 is operatively coupled to the output of the engine control computer interface unit 402. The drive controller 703 is configured to respond to the high-to-low transition received from the engine control computer interface unit 402 by shutting off the fuel injector control signal to the output driver 803, which, in turn causes the output driver 803 to turn completely off. This results in the fuel injector current falling to zero amperes thus resulting in the fuel injector 102 closing.

When the voltage at the battery voltage terminal 203 is substantially below the nominal value of 12 Vdc such as might be the case if the engine required a long period of cranking before it started, the fuel injector 102 current may never reach the "peak" value of 4.0 ampere. If this occurs, the voltage across the sense resistor 801 (FIG. 8) may not reach the 0.4 volt peak fuel injector current threshold in the drive controller 703. In this case, the drive controller 703 may not actively decrease the fuel injector control signal to the output driver 803 as described above, which may result in sustained current through the fuel injector 102 in excess of three amperes, which may cause the fuel injector 102 to overheat and fail.

Accordingly, the timer function of the drive controller 703 may be configured to prevent overheating and potential failure of the fuel injector 102 by automatically switching from a peak threshold signal level to a hold threshold signal level after a predetermined time period irrespective of the level of the fuel injector current. More specifically, in one embodiment of the present invention, a timer function of the drive controller 703 may be configured to automatically switch the drive controller 703 threshold reference voltage from the 0.4 volt value used to establish the peak fuel injector current, to the 0.1 volt value used to establish the hold fuel injector current.

More specifically, referring back to FIG. 7, in one embodiment, a value of 39,000 ohm for the resistor 701 and a value of 0.10 microfarad for the capacitor 702 in series therewith, may be configured to establish a 3.0 millisecond time period from when the Engine Control Computer 101 initiates to open the fuel injector 102, until the threshold reference is switched from the peak current reference to the hold current reference. It should be noted that three millisecond time period is sufficiently short to avoid the fuel injector from overheating and potentially sustaining damage even when the fuel injector current is in excess of 3 amperes for that time period.

For example, when the Engine Control Computer 101 is configured to close the fuel injector 102, the drive controller 703 is configured to operatively couple the timer input terminal 705 to the battery ground terminal 204. Thus, both terminals of the capacitor 702 are at ground voltage level. Since one terminal of the resistor 701 is connected to the power supply 407, while the other terminal of the resistor 701 is connected to the timer input terminal 705 of the drive controller 703, there is a 12 Vdc across the resistor 701 which causes a small, relatively insignificant current level flows through the resistor 701 (e.g., 0.13 milliampere). This state described herein of zero voltage across the capacitor 702 and 5 Vdc across the resistor 701 persists as long as the voltage at the input terminal 703 of the drive controller 703 is maintained at 0 Vdc level.

To turn the fuel injector 102 on, the input terminal 704 of the drive controller 703 is driven to 5 Vdc, to which, the drive controller 703 responds by disconnecting the timer input terminal 705 from the battery ground terminal 204, such that substantially no current flows into the timer input terminal 705. In turn, the current flow to the timer input terminal 705 is channeled to the capacitor 702, and with the current flow through the capacitor 702, the voltage across the capacitor rises from the initial value of zero volts. It should be noted here that the rate of the voltage increase across the capacitor 702 is determined by the values of the capacitor 702 and the resistor 701.

After the voltage at the input terminal 704 of the drive controller 703 transitions from low state to high state (i.e., the fuel injector 102 on), the drive controller 703 is configured to detect the voltage signal level at the timer input terminal 705, which begins increasing as a result of the current signal flowing across the capacitor 702. As discussed above, the drive controller 703 is configured to control the fuel injector 102 current level by measuring the voltage across sense resistor 801 and comparing it to the peak threshold level first, and then to the hold threshold level. If the voltage level at the timer input terminal 705 reaches a predetermined (and nonadjustable) threshold level, the timer function of the drive controller 703 is configured to force the sense resistor 801 measurement threshold level to change from the peak threshold level of, for example, 0.4 V to the hold threshold level of, for example, 0.1 V. This, in turn, causes the fuel injector 102 current level to lower to 1 ampere.

In cases where the battery (providing the voltage at the battery voltage terminal 203) is partially discharged, the fuel injector 102 current level may never reach 4 amperes, such that the peak threshold is not reached. However, the fuel injector 102 current level may be at a level only slightly less than 4 amperes, such as 3.9 amperes. In this case, if the peak threshold is not reached, and in the absence of a timer function as described above, the fuel injector 102 current level is maintained at the 3.9 amperes until the Engine Control Computer 101 commands the fuel injector 102 to close. This sustained, relatively large current may likely result in the fuel injector 102 overheating and resulting in operation failure. Thus, the timer function of the drive controller 703 is configured to avoid such overheating and failure of the fuel injector 102 by automatically switching from the peak threshold to the hold threshold after a predetermined period of time irrespective of the current level of the fuel injector 102, where the predetermined period of time is determined based on the selected values of the capacitor 702 and the resistor 701.

It should be noted that when the values at the battery voltage terminal 203 and at the battery voltage ground terminal 204 are at normal operating levels, the voltage across the sense resistor 801 will reach a value sufficient to cause the sense resistor measurement reference to switch from the peak current threshold to the hold current threshold in less than 1 millisecond. Indeed, as discussed above, the timer function of the drive controller 703 becomes important only when the battery voltage is abnormally low, such as might occur when an engine requires a long period of cranking before it finally starts.

Referring back to FIG. 7, the drive controller 703 further includes a positive sense terminal 705 and a negative sense terminal 706. All the current flowing through the fuel injector 102 has to flow through the sense resistor 801 (note that the diode 802 does not open unless the voltage across it exceeds 33 Vdc). The voltage across sense resistor 801 (the "sense voltage") is directly proportional to the current flowing through it. For example, for a sense resistor 801 having a value of 0.1 ohm, with a peak value of the current at 4 amperes, the sense voltage is 0.4 volts. As can be seen from FIGS. 7 and 8, the positive sense terminal 705 and the negative sense terminal 706 of the drive controller 703 are coupled to the respective terminals of the sense resistor 801 of the fuel injector output driver unit 404. Thus, in the case of the above example, where the fuel injector 102 current is 4 amperes, the sense voltage (or the voltage difference between the positive sense terminal 705 and the negative sense terminal 706) is 0.4 volt. Similarly, the fuel injector hold current of 1 ampere results in a sense voltage of 0.1 volt.

In one embodiment, the drive controller 703 is configured to detect the voltage signal level at the positive sense terminal 705 and at the negative sense terminal 706. Moreover, the drive controller 703 is further configured to compare the sense voltage measurement to two different threshold values—the peak and hold threshold values. In one embodiment, the 0.4 volt peak threshold value is active immediately following the low-to-high transition at the input terminal 704 of the drive controller 703. When the peak threshold value is reached, the drive controller 703 is configured to replace the peak threshold value with the hold threshold value. The same measurement and comparison process occurs with the hold threshold value as with the peak threshold value. In one embodiment, the negative sense terminal 706 may be substantially the same as the battery ground terminal 204 as shown in FIGS. 7 and 8.

FIG. 8 illustrates the fuel injector output driver unit 404 of the interface unit shown in FIG. 4 in accordance with one embodiment of the present invention. Referring to the Figure, in one embodiment, the fuel injector output driver unit 404 of the separate signal channel 401 of the interface unit 201 includes a sense resistor 801, a diode 802, and an output driver 803. In one embodiment, the output driver unit 404 may include a TIP 122 driver transistor, the sense resistor 801 may include a 0.10 ohm resistor, and the diode 802 may include a 1N5364B zener diode available from Microsemi Corporation.

Referring back to FIG. 8, in one embodiment, the output driver 803 may be configured to function as the electric "valve" used to control the voltage across, and thus the electric current flowing through, the fuel injector 102. The sense resistor 801 may be configured to provide the voltage feedback signal to the fuel injector electric current control unit 403 as discussed above in conjunction with FIG. 7. The diode 802 in one embodiment may be configured to protect the output driver 803 from high voltage transients that may occur when the output driver 803 turns off.

That is, when the output driver 803 turns off, the current flowing therethrough abruptly drops to zero ampere. However, as discussed above, the physical properties of the fuel injector 102 including a coil of wire is such that the current flowing through the coil of wire cannot change instantaneously. Thus, the current that continues to flow through the fuel injector 102 may reach a "dead end" at the output driver 803 in its turned off state, resulting in a rapid increase of voltage across the drive transistor 803. In other words, while the output driver 803 is turned on, current flows from the battery voltage terminal 204 through the fuel injector 102, the output driver 803, and the sense resistor 801 to battery ground terminal 204.

Assuming, for example, that one ampere of current is flowing and all of the components discussed above have reached a steady state. With the output driver 803 switch abruptly opening, the one ampere of current flowing through the fuel injector 102 cannot be abruptly stopped from flowing—a characteristic of electric coils discussed above. But after the current leaves the fuel injector coil, it has nowhere to go, and the path through the output driver 803 is now blocked—it's a dead end. In this case, the current essentially "stacks up" against the point of the blockage (which is inside the output driver 803) which results in the voltage on the output terminal (to the fuel injector 102) of the output driver 803 to rise very high very quickly.

If unmitigated, this voltage rise may cause failure of the output driver 803. As such, in one embodiment, the diode 802 may be configured to protect the output driver 803 by opening its switch to give the stacked up current a path to the ground terminal. Accordingly, in one embodiment, the diode 802 coupled between the battery ground terminal 204 and the output terminal of the output driver 803, turns on when this voltage reaches 33 volts and conducts the accumulated current to the battery ground terminal 204, thus protecting the output driver 803 from the excessive voltage.

Figure 9:
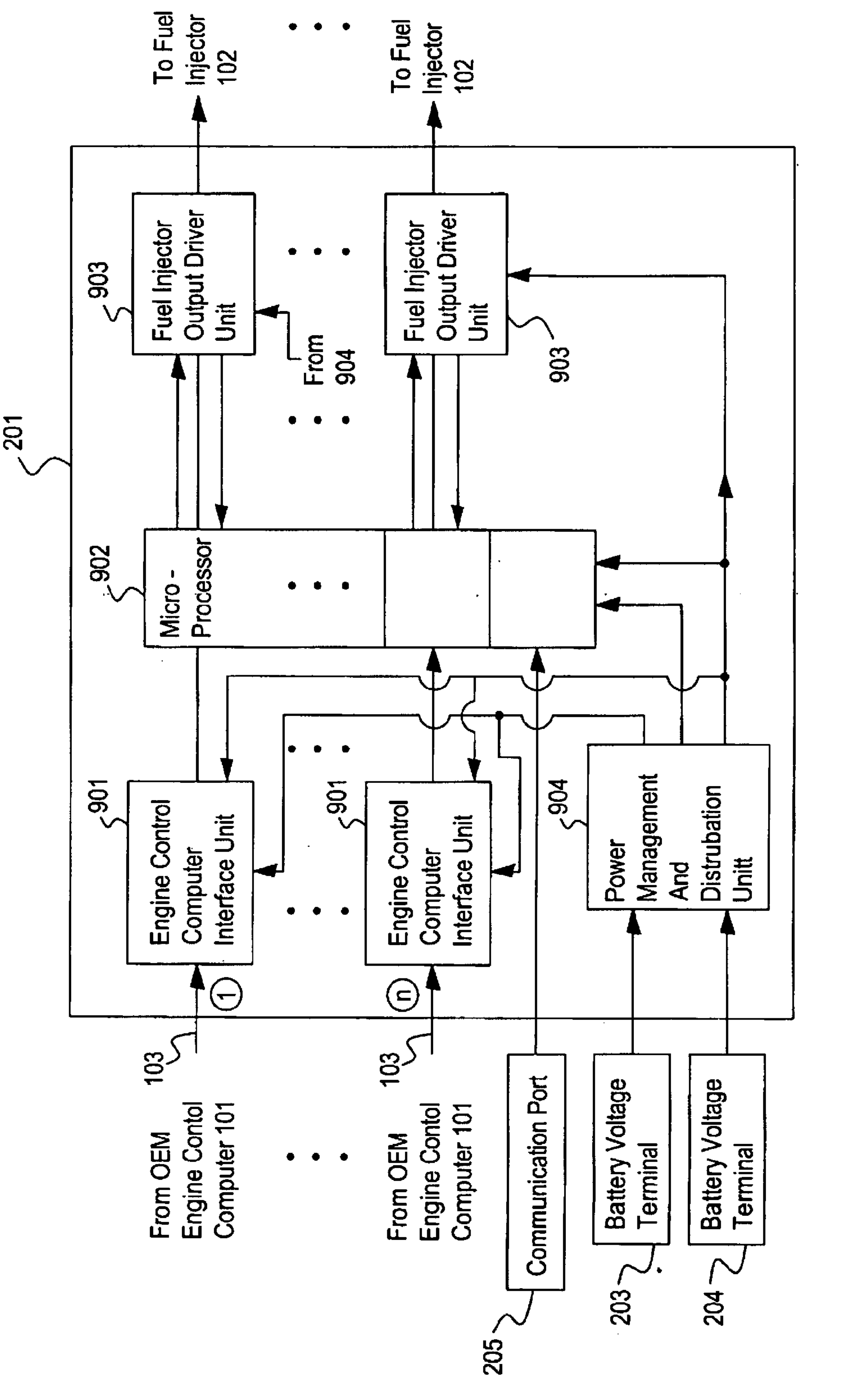
FIG. 9 is a block diagram illustrating the interface unit of the overall system shown in FIGS. 2–3 in accordance with another embodiment of the present invention.

FIG. 9 is a block diagram illustrating the interface unit of the overall system shown in FIGS. 2–3 in accordance with another embodiment of the present invention. Referring to the Figure, there is provided an independent channel (i.e., channels 1 to n) for each fuel injector 102 to be controlled. More specifically, each independent channel includes an engine control computer interface unit 901 operatively coupled to a microprocessor 902, and a fuel injector output driver unit 903 configured to receive the output signals of the microprocessor 902. Also shown in FIG. 9 is a power management and distribution unit 904 operatively coupled to the microprocessor and each of the engine control and computer interface unit 901 and fuel injector output driver units 903 of the interface unit 201.

In one embodiment, the power management and distribution unit 904 may be separately coupled to each of the engine control computer interface units 901, the microprocessor 902, and the fuel injector output driver units 903, to support separate suitable powering requirements of the respective each of the engine control computer interface units 901, the microprocessor 902, and the fuel injector output driver units 903. For example, in one embodiment, the power management and distribution unit 904 may provide a 5 volt supply to the engine control computer interface units 902, while providing a 3.3 volt power supply to the microprocessor 902.

Referring back to FIG. 9, the fuel injector control wire 103 coupled to the Engine Control Computer 101 (not shown) is similarly operatively coupled to each Engine Control Computer interface unit 901 for each respective independent channel (1 to n). Also can be seen from FIG. 9 are battery voltage terminal 203 and battery ground terminal 204 which are operatively coupled to the power management and distribution unit 904. Moreover, the communication port 205 is operatively coupled to the microprocessor 902 for user input signal transmission as discussed in further detail below. Additionally, the power management and distribution unit 904 in one embodiment is configured to provide the suitable voltage and current levels to each of the engine control computer interface unit 901 and the fuel injector output driver unit 903 as shown in FIG. 9.

As compared with the embodiment of the interface unit 401 illustrated and described in conjunction with FIGS. 4 and 6–8, the microprocessor 902 in one embodiment is configured to perform the functions of the fuel injector electric current control unit 403 (FIG. 4) in the embodiment shown in FIG. 9. Moreover, referring back to FIG. 9, the communication port 205 is configured to permit users to provide functional parameters for the interface unit 201, for example, by writing data to the microprocessor 902, and by confirming those user settings by reading data from the microprocessor 902.

Figure 10:
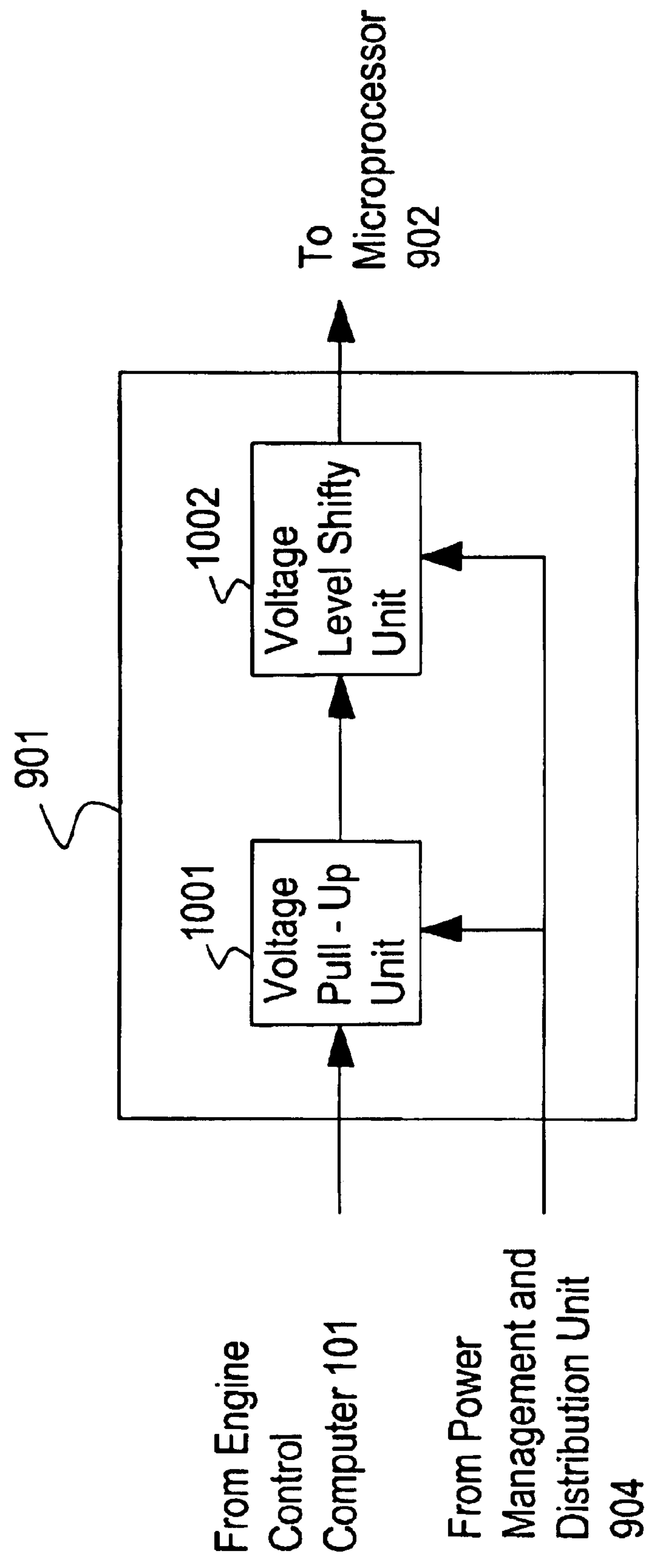
FIG. 10 is a block diagram of the engine control computer interface unit for the interface unit shown in FIG. 9 in accordance with another embodiment of the present invention.

FIG. 10 is a block diagram of the engine control computer interface unit 901 for the interface unit shown in FIG. 9 in accordance with another embodiment of the present invention. Referring to the Figure, the engine control computer interface unit 901 in one embodiment is configured to provide the electrical pull-up and voltage translation functions as described above in conjunction with FIG. 6. More specifically, the engine control computer interface unit 901 in one embodiment includes a pull-up function unit 1001 and a voltage level shift unit 1002. As discussed above, the signal from the Engine Control Computer 101 (not shown) to the fuel injector control wire 103 requires a pull-up for proper operation, which is provided by the pull-up function unit 1001. As discussed above, the fuel injector control wire 103 toggles between two steady state voltage values—the voltage of the battery voltage terminal 203 (nominally 12 Vdc) when the fuel injector 102 is closed, and the voltage of the battery ground terminal 204 (nominally 0 Vdc) when the fuel injector 102 is open. Furthermore, the microprocessor 902 (FIG. 9) in one embodiment may require a smaller voltage swing (for example, a 5 Vdc logic or a 3.3 Vdc logic). Thus, in one embodiment of the present invention, the voltage level shift unit 1002 may be configured to convert the nominal 12 Vdc voltage swing of the fuel injector control wire 103 to a smaller voltage swing suitable to the microprocessor 902 of the interface unit 401.

Accordingly, while the embodiment described above in conjunction with FIGS. 4–8 may require a single 5 volt power supply, as discussed above, the embodiment shown in FIG. 9, for example, may require multiple supply voltages. The particular regulated supply voltages for a given implementation of the engine control computer interface unit 901 may vary according to the specific selected components. By way of an example, the pull-up function unit 1001 may require a 5 Vdc supply while the voltage level shift unit 1002 may require a 3.3 Vdc supply. Furthermore, in one embodiment, when the Engine Control Computer 101 (not shown) opens a fuel injector 102, the engine control computer interface unit 901 is configured to output a voltage level (e.g., translated control voltage signal) that is defined to indicate a "fuel injector open" state. On the other hand, when the Engine Control Computer 101 closes the fuel injector 102, the engine control computer interface unit 901 is configured to output a voltage level (i.e., translated control voltage signal) that is defined to indicate a "fuel injector close" state. The values for output voltage levels of the engine control computer interface unit 901 corresponding to the fuel injector open state and to the fuel injector output state will vary depending on the particular microprocessor 902 specification selected for the suitable implementation, and the scope of the present invention is intended to encompass those values and ranges that are appropriate for the function of the microprocessor 902.

Figure 11:
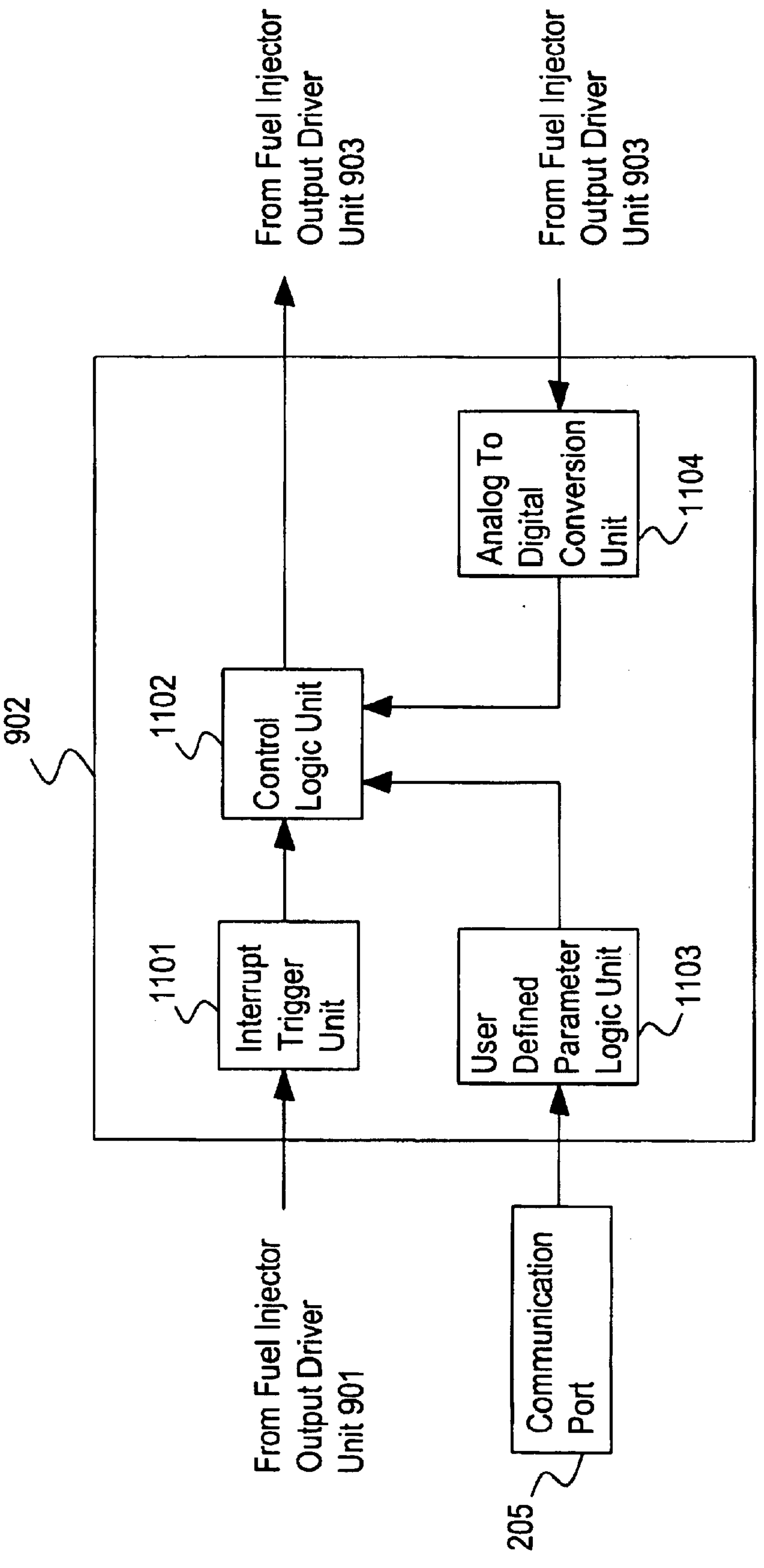
FIG. 11 is a block diagram of a single channel of the microprocessor of FIG. 9 for the interface unit shown in FIG. 9 in accordance with one embodiment of the present invention.

FIG. 11 is a block diagram illustrating a single channel of the microprocessor 902 shown in FIG. 9 for the interface unit shown in FIGS. 2 and 3 in accordance with one embodiment of the present invention. Functionally substantially equivalent to the fuel injector electric current control unit 403 (FIG. 7), the microprocessor 902 in one embodiment is configured to convert the on-and-off fuel injector control received from the Engine Control Computer 101 into a more sophisticated signal that algorithmically varies the fuel injector current over time as discussed in detail above in conjunction with FIG. 7. More specifically, referring to FIG. 11, the microprocessor 902 includes an interrupt trigger unit 1101 which, in one embodiment, is configured to provide the necessary interface between the output signal (e.g., translated control voltage signal) of the engine control computer interface unit 901 (FIG. 9) and a control logic unit 1102. For example, in one embodiment, the interrupt trigger unit 1101 may include a combination of a microprocessor input pin with its related internal circuitry and software code written to service electrical signals appearing on the input pin.

As discussed above, the output signal of the engine control computer interface unit 901 (the translated control voltage signal) may exist in one of two states—either "fuel injector off" state or "fuel injector on" state. These two states are generated in response to the state of the signal on the fuel injector control wire 103 from the Engine Control Computer 101. The interrupt trigger unit 1101 in one embodiment is configured to respond to the transition from "fuel injector off" state to "fuel injector on" state by instructing the control logic unit 1102 to begin executing a set of instructions (or code) configured to open the corresponding fuel injector 102. Moreover, the interrupt trigger unit 1101 may further be configured to respond to the transition from "fuel injector on" state to "fuel injector off" state by instructing the control logic unit 1102 to begin executing the set of instructions (the code) that closes the corresponding fuel injector 102. A description of the transition states between fuel injector off-to-on and fuel injector on-to-off states is provided in further detail below.

It should be noted that the various processes described above including the sets of instructions for operating in the software application execution environment at the microprocessor 902 as discussed in conjunction with FIGS. 9–13, may be embodied as computer programs developed using an object oriented language that allows the modeling of complex systems with modular objects to create abstractions that are representative of real world, physical objects and their interrelationships. The software required to carry out the inventive process, which may be stored in the microprocessor 902, may be developed by a person of ordinary skill in the art and may include one or more computer program products.

Referring back to FIG. 11, in one embodiment, when the control logic unit 1102 receives a "fuel injector open" signal from the interrupt trigger unit 1101, it responds by setting the output signal of the microprocessor (e.g., the output driver control signal) to its maximum level, thus making no attempt to control the increase in fuel injector current. This initial rapid fuel injector current rise, which is a function of the particular fuel injector impedance value and the available battery voltage, results in a rapid injector opening rate, which in turn results in optimal fuel delivery control. While the "fuel injector open" condition is true, in one embodiment, the control logic unit 1102 may be configured to monitor a feedback signal (e.g., the output driver feedback signal) received from the fuel injector output driver unit 903 (FIG. 9). This feedback signal, which is converted from analog to digital form by an analog to digital (A/D) conversion unit 1104, is substantially proportional to the level of electrical current flowing through the fuel injector 102. By measuring this feedback signal, the control logic unit 1102 may determine how much electrical current is flowing through the fuel injector 102.

When the fuel injector current measurement reaches a predetermined maximum value (e.g., the "peak" current, nominally 4 amperes), the control logic unit 1102 in one embodiment is configured to rapidly decrease the output signal (output driver control signal) of the microprocessor 902 to the corresponding fuel injector output driver unit 903. This causes the fuel injector current to decrease to a smaller value that can be maintained for the remainder of the fuel injector open time period without causing the fuel injector 102 to overheat (for example, at the "hold" current, nominally 1 ampere).

In normal operating mode, the control logic unit 1102 is configured to maintain a constant "hold" current until the "fuel injector close" condition is true. This is achieved by periodically measuring the feedback signal (output driver feedback voltage) from the A/D conversion unit 1104, comparing the measured feedback value to the value corresponding to the desired hold current, and then adjusting the output signal (output driver control signal) to compensate for any deviations from the desired hold current value. The desired hold current value for the measured feedback signal may depend on the value of the feedback resistor (for example, resistor 801). For example, with a value of 0.1 ohm for the resistor 801, the desired feedback value would be 0.4 volts, and with a larger resistor 801 value of 1.0 ohms, the desired feedback signal would be 4.0 volts.

By way of example, if the measured hold current is too large, the output signal (output driver control signal) is decreased. On the other hand, if the measured hold current is too small, the output signal (output driver control signal) is increased. When the control logic unit 1102 receives a "fuel injector close" signal from the interrupt trigger unit 1101, in one embodiment, the control logic unit 1102 is configured to set the output signal (output driver control signal) of the microprocessor 902 to a predetermined minimum level, and transmit it to the fuel injector output driver unit 903 (FIG. 9). That is, when the control logic unit 1102 receives a "fuel injector close" signal, it causes the output driver unit 1201 of the fuel injector output driver unit 903 to turn off by, for example, setting the output driver control signal to its minimum level. Then, the fuel injector output driver unit 903 is configured to disconnect the terminal of the fuel injector 102 from the battery ground terminal 204 which, in turn, causes the fuel injector 102 to close.

Again referring to FIG. 11, the control logic unit 1102 may further include a timer function (for example, implemented in computer software programmed into the control logic unit 1102) substantially similar to the timer function described in conjunction with drive controller 703 (FIG. 7). In particular, the timer function of control logic unit 1102 will cause the threshold to which the feedback signal (output driver feedback voltage) from the A/D conversion unit 1104 is compared, to switch from the "peak" threshold to the "hold" threshold after a predetermined period of time. As discussed in conjunction with drive controller 703 (FIG. 7), the timer function discussed herein may become significant if the battery voltage is less than its nominal value of, for example, 12 volts. In this case, since the fuel injector current may not reach its peak value, the feedback signal may never reach the peak current threshold. Absent the timer function, the fuel injector current may then persist at a value substantially above the safe hold current, possibly resulting in catastrophic failure of the fuel injector 102. However, in such cases, the timer function discussed above may be configured to intercede to force the fuel injector current down to the safe hold current value, thus preventing the failure such as overheating.

Referring back to FIG. 11, microprocessor 902 further includes a parameter logic unit 1103 configured, in one embodiment, to receive user defined values for input to the interface unit 201 from the user via the communication port 205. In one embodiment, the user may input values via the communication port 205 using a personal computer, a handheld computer, or any other functionally equivalent devices which are capable of performing data communication functions. In one embodiment, the communication port 205 may include a serial port (RS232).

As discussed in further detail below, the parameter logic unit 1103 provides the user with the ability to effect the fuel injector open time by writing values to the parameter logic unit 1103. In one embodiment, each channel is configured to support a full set of user defined parameters which are independent of the user defined values for the other channels of the interface unit 201. More specifically, in one aspect of the present invention, the parameters of the parameter logic unit 1103 may include peak current parameter, hold current parameter, additive constant parameter and a multiplicative constant parameter, each of which is discussed in further detail below.

More specifically, the peak current parameter determines the maximum amount of current for the fuel injectors 102. The peak current parameter may be increased to open the fuel injectors more rapidly than they would with the nominal 4 ampere setting. A more rapid opening time leads to a more predictable quantity of fuel delivered for a given pulsewidth. As discussed above, this is due to the fuel injector flow during the closed-to-open and open-to-closed transitions which are not well controlled or characterized. Because the total pulsewidth (the length of time the fuel injector 102 is open) includes the closed-to-open and open-to-closed transitions, as well as a period during which the fuel injector 102 is fully open (and during which its flow is well controlled and characterized), minimizing the transition time period decreases its adverse impact on the pulsewidth.

Conversely, the peak current parameter may be decreased to equal to the hold current in order to operate the engine with high impedance fuel injectors. The hold current parameter determines the amount of permissible sustained fuel injector current that exists subsequent to the fuel injector current reaching the maximum level, that is, the peak current parameter. For example, the hold current parameter may need to be adjusted to accommodate a predetermined set of low impedance fuel injectors that requires more than a one ampere hold current.

The fuel injector open-time additive constant parameter is added to the fuel injector open time commanded by the Engine Control Computer 101. When the additive constant parameter is a positive value, the fuel injector 102 is configured to be held open for the length of time specified by the additive constant parameter after the Engine Control Computer 101 commands the fuel injector 102 to close. On the other hand, when the additive constant parameter is a negative value, the fuel injector is configured to close before the Engine Control Computer 101 commands the fuel injector 102 to close by the length of time specified by the additive constant parameter. When the additive constant parameter is zero, it has no effect.

Finally, the fuel injector open-time multiplicative constant parameter is a factor by which the fuel injector open time commanded by the Engine Control Computer 101 is multiplied. When the multiplicative constant parameter is greater than 1.0, the fuel injector 102 is configured to be held open for an additional length of time after the Engine Control Computer 101 commands the fuel injector 102 to close, where, the additional open time is given by multiplying the commanded open time by a quantity determined by subtracting a value of 1 from the multiplicative constant parameter. On the other hand, when the multiplicative constant parameter is less than 1.0, the fuel injector 102 is configured to close for a predetermined length of time before the Engine Control Computer 101 commands the fuel injector to close, where the predetermined length of time is determined by multiplying the commanded open time by a quantity determined by subtracting the multiplicative constant parameter from a value of 1.

The fuel injector open time additive and multiplicative constant parameter may be expressed as follows:

$$AOT=(MC*COT)+AC \quad (1)$$

where AOT is the actual open time, MC is the multiplicative constant parameter, COT is the commanded open time (i.e., the open time intended by the Engine Control Computer 101), and the AC is the additive constant parameter.

Figure 12:
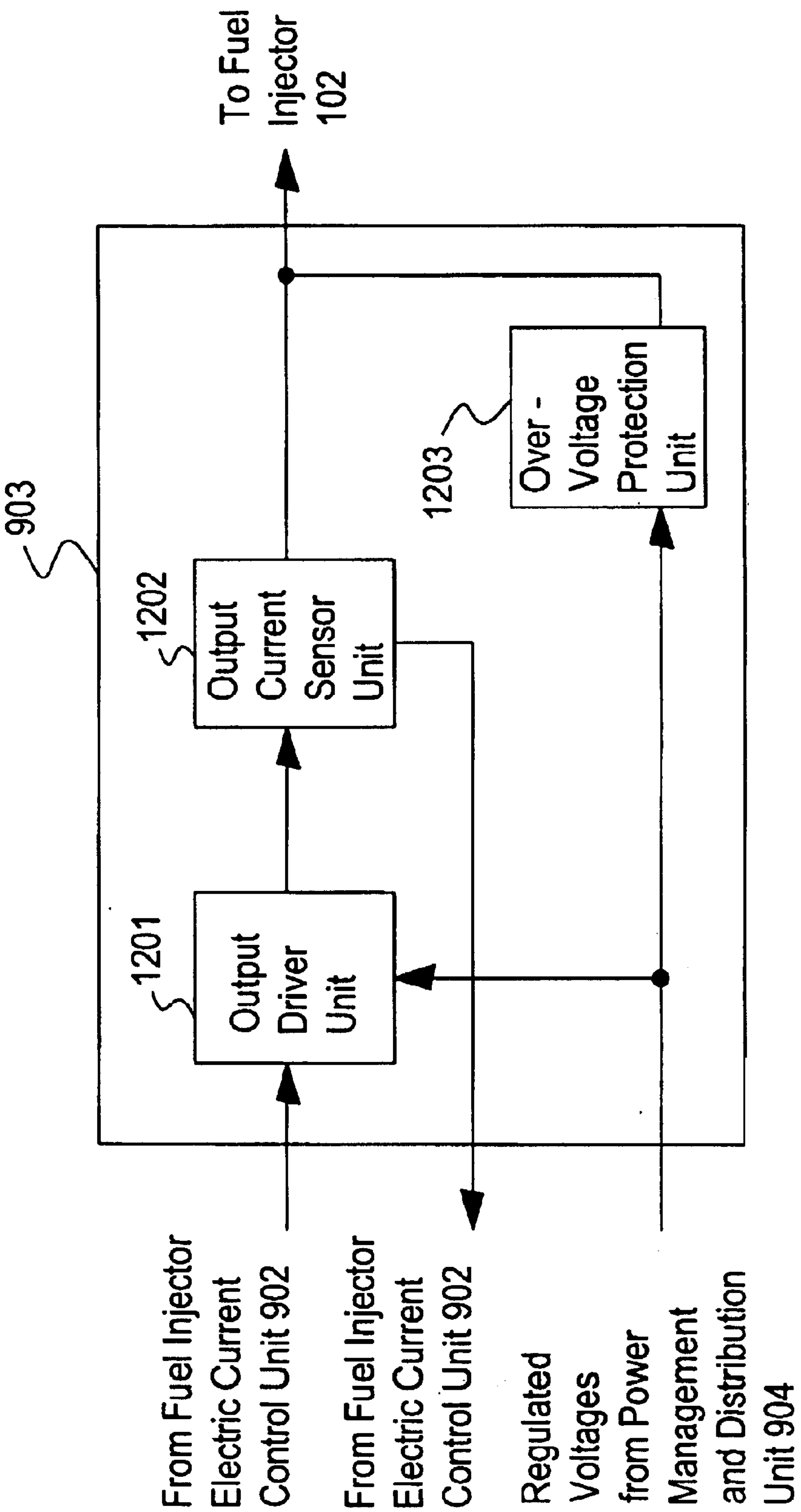
FIG. 12 is a block diagram of the fuel injector output driver unit for the interface unit shown in FIG. 9 in accordance with another embodiment of the present invention.

FIG. 12 is a block diagram of one channel of the fuel injector output driver unit 903 for the interface unit shown in FIG. 9 in accordance with another embodiment of the present invention. Referring to the Figure, in one embodiment, the fuel injector output driver unit 903 includes an output driver unit 1201 configured to receive the output signal from the microprocessor 902 of the interface unit 201, an output current sensor unit 1202 operatively coupled to the output driver unit 1201 configured to receive output signal therefrom, and an over-voltage protection unit 1203 operatively coupled to the output of the output current sensor unit 1202.

In one embodiment, the output driver unit 1201 may be configured to variably control the voltage level at the terminal of the fuel injector 102. It should be noted that generating the appropriate voltage level at the terminal of the fuel injector 102 results in the fuel injector current achieving the desired peak and hold values. In one embodiment, the output driver unit 1201 may be implemented with one or more transistors. In this case, the signal output from the microprocessor 902 (FIG. 9) is provided to the control pin of the transistors operating as the output driver unit 1201. The fuel injector electric current is then conducted through the transistor channels. By using the output driver control signal from the output of the microprocessor 902 to vary the transistor channel characteristics, it is possible to use the transistors as the output driver unit 1201 to control the current flowing through the fuel injector 102.

Referring back to FIG. 12, in order for the microprocessor 902 to be able to control the level of electric current flowing through the fuel injector 102, the microprocessor 902 may need to be able to measure the fuel injector current level. To this end, the output current sensor unit 1202 in one embodiment may be configured to determine the current level flowing through the fuel injector 102. Indeed, in one embodiment, the output current sensor unit 1202 may include a precision resistor through which the fuel injector current flows. The flow of current through such resistor may generate a voltage across the resistor terminals that may be measured using an analog to digital converter (not shown) and a measurement function inside the microprocessor 902. The voltage measurement is then converted by the control logic unit 1102 (FIG. 11) into a current value by applying the known value of the precision resistor.

More specifically, in one embodiment, the variable analog voltage across the output sensor unit 1202 is converted to a digitized voltage signal by the A/D conversion unit 1104 of the microprocessor 902. After the fuel injector 102 is commanded to open by the Engine Control Computer 101, microprocessor 902 is configured to periodically compare the magnitude of the digitized voltage signal with values from a lookup table stored inside the microprocessor 902 in order to retrieve the stored value which is closest in magnitude to the magnitude of the digitized voltage signal. For each stored value of the lookup table, there is also stored in the lookup table a corresponding output signal value which is output from control logic unit 1102 to the output driver unit 1201.

In this manner, the microprocessor 902 in one embodiment is configured to periodically compare the digitized voltage signal with values stored in the lookup table discussed above, and based on the retrieved value from the lookup table, to determine the corresponding output control signal value, and to provide the output control signal value to the output driver unit 1201. In this manner, by determining the output current sensor unit 1202 feedback signal it is possible to reliably control the signal to the output driver unit 1201 such that the fuel injector current flowing therethrough achieves the desired peak and hold currents.

Referring yet again to FIG. 12, when the output driver unit 1201 turns off the flow of electricity through the fuel injector 102, the voltage on the wire from the output driver unit 1201 to the fuel injector 102 rises very rapidly causing a voltage spike as discussed above in further detail. Accordingly, in one embodiment, the fuel injector output driver unit 903 of the interface unit 201 may include an over-voltage protection unit 1203 which is configured to protect the output driver unit 1201 from potentially damaging voltage levels by shunting the current flow to the battery ground terminal 203 which limits the maximum voltage excursion at the output driver unit 1201 to a safe level.

In the manner described above, in accordance with one embodiment of the present invention, the fuel injector output driver unit 903 of the interface unit 201 may be configured to provide the ability to adjust several amperes of electric current without overheating. In other words, the fuel injector output driver unit 903 may be configured to operate as an electric "valve", operated under the control of the microprocessor 902, to adjust the current flowing through the fuel injector 102.

Figure 13:
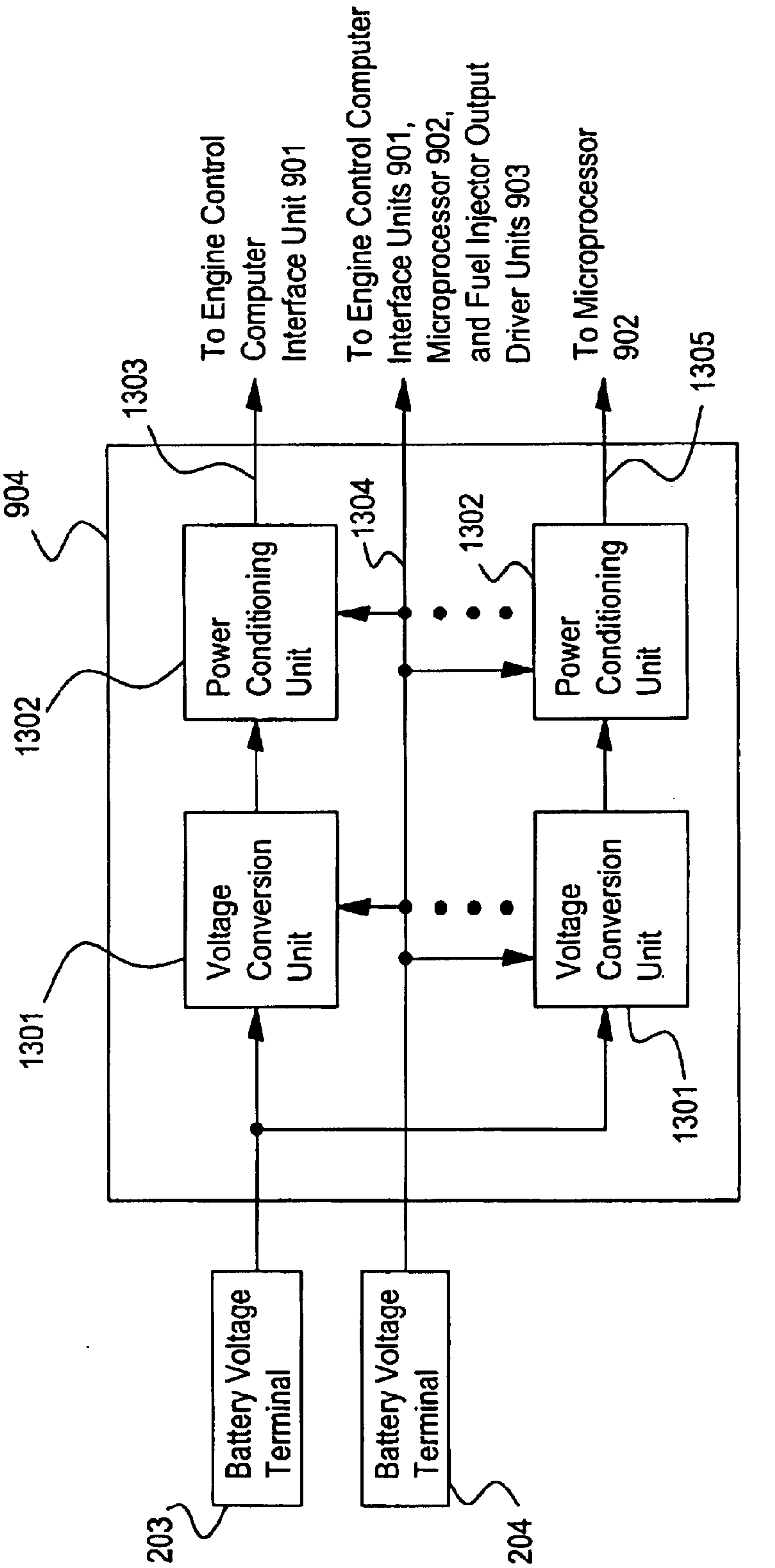
FIG. 13 is a block diagram of the power management and distribution unit for the interface unit shown in FIG. 9 in accordance with one embodiment of the present invention.

FIG. 13 is a block diagram of the power management and distribution block for the interface unit shown in FIG. 9 in accordance with one embodiment of the present invention. Referring to the Figure, in accordance with one embodiment of the present invention, there is provided a plurality of voltage conversion units 1301 operatively coupled to a respective one of a plurality of power conditioning units 1302. As can be seen, each of the voltage conversion units 1301 is operatively coupled to the battery voltage terminal 203 and the battery ground terminal 204. Moreover, the battery ground terminal 204 is also operatively coupled to each of the power conditioning units 1302.

In one embodiment, the power management and distribution unit 904 may be configured to provide the voltages and current signals to power the engine control computer interface units 901, the microprocessor 902, and the respective fuel injector output driver units 903. In operation, the voltage level of the battery voltage terminal (nominally 12 Vdc) may be too high to operate the digital integrated circuitry of the interface unit 201 such that, the power management and distribution unit 904 in one embodiment may be configured to convert the voltage level of the battery voltage terminal 203 to lower voltage values compatible with digital integrated circuitry of the interface unit 201 (for example, 5 Vdc for TTL and CMOS device families, 3.3 Vdc for Low Voltage CMOS device families).

Referring back to FIG. 13, multiple sets of voltage conversion units 1301 and corresponding power conditioning units 1302 may be provided in the power management and distribution unit 904 in one embodiment of the present invention, to provide multiple different internal voltage levels as may be necessary to operate the functions within the interface unit 201. As shown, in one embodiment, power output terminal 1303 is operatively coupled to each of the engine control computer interface units 901 to provide the appropriate power supply thereto (for example, 5 volts), while the power output terminal 1305 is operatively coupled to the microprocessor 902 to provide the suitable power supply to the microprocessor 902. Furthermore, it can be seen from the Figure that the power output terminal 1304 is operatively coupled to each of the engine control computer interface units 901, the microprocessor 902, and each of the fuel injector output driver units 903, and configured to provide connection to the battery ground terminal 204. It should be noted that the voltage distribution is typically implemented as copper traces on a printed circuit board.

In one embodiment, the voltage conversion units 1301 are typically implemented as single-chip voltage regulators and power conditioning units 1302 are typically implemented as a single, relatively large-valued tantalum capacitor physically located near the voltage regulator and a plurality of relatively small-valued ceramic capacitors positioned "scattered" around the circuit board. This "scattering" is meant to result in a relatively uniform distribution of the plurality of the small-valued capacitors across the circuit board area. The capacitors are needed to minimize electrical noise on the supply voltage outputs that is a side effect of the voltage conversion process used in inexpensive voltage regulators. The large value tantalum capacitor filters out low frequency noise while the small value ceramic capacitors filter high frequency noise. Large value tantalum capacitors are most effective when located near the voltage regulator while the small value ceramic capacitors are most effective when located near the integrated circuits (ICs) using the voltage supplied by the voltage regulator.

Referring back to FIGS. 9 and 11, the multiplicative constant parameter is a fixed value by which all pulsewidths from the Engine Control Computer 101 are multiplied before being used to operate the fuel injectors. The additive constant parameter is added to all pulsewidths from the Engine Control Computer 101 before they are used to operate the fuel injectors. Both of these constants can be either positive or negative values. Their effects are presented graphically in the following FIGS. 14A and 14B.

Figure 14A:
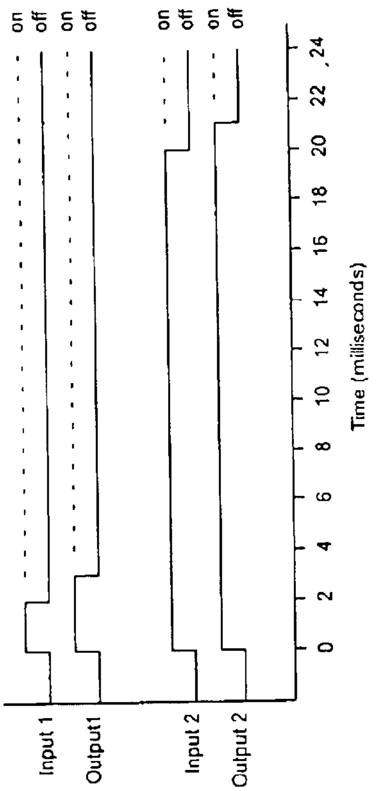
FIGS. 14A–14B illustrate the effect of an additive constant and a multiplicative constant, respectively, on fuel injector pulsewidth in accordance with one embodiment.

FIG. 14A shows the effect of an additive constant parameter of one millisecond on both a two millisecond and a 20 millisecond input pulsewidth. The additive constant parameter represents a 50% increase of the output pulsewidth over the 2 millisecond input pulsewidth (that is, from two milliseconds to three milliseconds), but only a 5% increase of the output pulsewidth over the 20 millisecond input pulsewidth (that is, from 20 milliseconds to 21 milliseconds). Thus the additive constant parameter causes a relatively larger effect on short pulsewidths such as would be present during low engine speeds and loads, and a relatively small effect on the long pulsewidths characteristic of high engine speeds and loads. This may be useful to adjust fuel delivery under engine idling and steady speed conditions, which tend to represent light engine loads, while leaving acceleration and hill climbing fuel delivery conditions, which tend to represent heavy engine loads, relatively unchanged. The additive constant parameter may be negative rather than positive, which will cause the output pulsewidths to be shorter than the input pulsewidths. The above discussion of the relative effect of the additive constant parameter on short versus long input pulsewidths applies for the negative additive constant parameter.

Figure 14B:
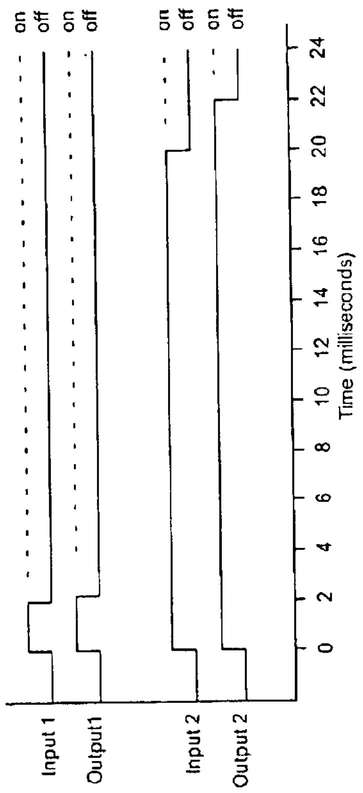

FIG. 14B shows the effect of a multiplicative constant parameter of 1.10 on both a 2 millisecond and a 20 millisecond input pulsewidth. The multiplicative constant parameter represents a 10% change for both input pulsewidths. Thus the multiplicative constant parameter is useful when the pulsewidths need the same relative adjustment at all operating speeds and loads. Such an adjustment might be required if an aging fuel pump has resulted in a fuel pressure decrease, which has the effect of decreasing the amount of fuel delivered for a given pulsewidth. The multiplicative constant parameter may be negative rather than positive, which will cause the output pulsewidths to be shorter than the input pulsewidths. The above discussion of the relative effect of the multiplicative constant parameter on short versus long input pulsewidths applies for the negative multiplicative constant parameter.

In the manner described above, in accordance with the various embodiments of the present invention, there is provided a system and method for retrofitting a low impedance fuel injection system to a high impedance fuel injector system of an internal combustion engine. The original high impedance electronic control system may be retained, while system modification circuitry may be added along the fuel injector control path. To this end, an original fuel injector control signal may be intercepted along the fuel injector control wire. The intercepted signal is then modified from a simple on-off signal to a signal which varies the fuel injector current as a function of time, such that the on-state from the original high impedance system is converted to a current controlled signal.

In a further embodiment of the present invention, there is provided a method for modifying a low-impedance fuel injection control signal which may include the steps of intercepting a fuel injector control signal along the fuel injector control wire, and modifying the fuel injector control signal such that this modified fuel injector control signal is both current controlled and of a different pulsewidth.

Moreover, in accordance with one embodiment, the method may further include a step of voltage level shifting for matching the signal voltage levels of the vehicle's original fuel injector control signal to the signal levels used in the embodiment. Additionally, in accordance with a further embodiment, there may be provided a mechanism for preventing the vehicle's original fuel control circuitry and computer system from generating a fuel injector fault code. Also, yet a further embodiment may include the bypass switch mechanism including a bypass switch 405 and the multiplexer 406, for example, for permitting the user to select between the original fuel injector control signal and the current controlled fuel injector control signal from the interface unit 201. In this manner, the user may easily connect the engine's fuel injectors 102 to either the high impedance fuel injector signal directly from the Engine Control Computer 101, or the low impedance fuel injector control signal of the interface unit 201 without the need to change any wiring, and without the need to modify the settings via data input through the serial communication port 205.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An interface apparatus for use in a fuel injector engine system, comprising:

an input terminal configured to receive a fuel injector control signal;

a controller including an engine control computer interface unit, a current control unit and an output driver, the controller operatively coupled to the input terminal to receive said fuel injector control signal, and in accordance therewith, generating a corresponding current controlled fuel injector control signal; and an output terminal operatively coupled to the controller for outputting said current controlled fuel injector control signal.

2. The apparatus of claim 1 further including a power supply operatively coupled to the controller, the power supply configured to provide one or more power signals to the controller.

3. The apparatus of claim 1 wherein the input terminal is operatively coupled to a fuel injector control wire, and further, wherein the output terminal is operatively coupled to a fuel injector.

4. The apparatus of claim 3 wherein the input terminal is configured to receive said fuel injector control signal from an engine control computer operatively coupled to the fuel injector control wire.

5. The apparatus of claim 3 wherein the controller is configured to transmit the current controlled fuel injector control signal to said fuel injector via said output terminal.

6. The apparatus of claim 3 wherein said current controlled fuel injector control signal is configured to variably modify the signal level provided to the fuel injector, and further, wherein said fuel injector is configured to open or close in accordance with the variably modified signal level.

7. The apparatus of claim 1 wherein:

the engine control computer interface unit is configured to generate one or more voltage level shifting logic signals corresponding to the received fuel injector control signal;

the current control unit is operatively coupled to the engine control computer interface unit, the current control unit configured to generate an output driver signal corresponding to the one or more voltage level shifting logic signals received from the engine control computer interface unit; and the output driver is operatively coupled to the current control unit, the output driver configured to variably adjust the signal level of the output terminal based on the current controlled fuel injector control signal.

8. The apparatus of claim 7 wherein the received fuel injector control signal includes one of a 12 volt signal and a zero volt signal, and further, wherein the generated voltage level shifting logic signal includes one of a zero volt signal and a 5 volt signal.

9. The apparatus of claim 7 wherein the output driver is further configured to generate a feedback signal based on the signal level of the output terminal, and to provide the feedback signal to the current control unit.

10. The apparatus of claim 7 wherein the engine control computer interface unit includes:

a buffer; and a resistor operatively coupled to an input terminal of the inverting buffer;

wherein an output terminal of the inverting buffer is operatively coupled to the current control unit.

11. The apparatus of claim 10 wherein the buffer includes an inverting buffer.

12. The apparatus of claim 10 wherein the buffer includes an octal inverting buffer, and further, wherein the resistor includes a 1,000 ohm pull-up resistor.

13. The apparatus of claim 10 further including a power supply, said power supply operatively coupled to said buffer and said resistor.

14. The apparatus of claim 7 wherein said current control unit includes a drive controller configured to generate said output driver signal.

15. The apparatus of claim 1 further including a communication port operatively coupled to the controller, the communication port configured to receive one or more input data.

16. The apparatus of claim 15 wherein the communication port includes an RS 232 port.

17. An apparatus for providing a low impedance fuel injector engine system, comprising:

an input terminal configured to receive a fuel injector control signal;

a controller including an engine control computer interface unit, a current control unit and an output driver, the controller operatively coupled to the input terminal to receive said fuel injector control signal, and in accordance therewith, generating a corresponding current controlled fuel injector control signal;

an output terminal operatively coupled to the controller for outputting said current controlled fuel injector control signal; and a power supply operatively coupled to the controller, the power supply configured to provide one or more power signals to the controller.

18. The apparatus of claim 17 wherein the input terminal is operatively coupled to a fuel injector control wire, and further, wherein the output terminal is operatively coupled to a fuel injector.

19. The apparatus of claim 18 wherein the input terminal is configured to receive said fuel injector control signal from an engine control computer operatively coupled to the fuel injector control wire.

20. The apparatus of claim 18 wherein the controller is configured to transmit the current controlled fuel injector control signal to said fuel injector via said output terminal.

21. The apparatus of claim 18 wherein said current controlled fuel injector control signal is configured to variably modify the signal level provided to the fuel injector, and further, wherein said fuel injector is configured to open or close in accordance with the variably modified signal level.

22. The apparatus of claim 17 wherein:

the engine control computer interface unit is configured to generate one or more voltage level shifting logic signals corresponding to the received fuel injector control signal;

the current control unit is operatively coupled to the engine control computer interface unit, the current control unit configured to generate an output driver signal corresponding to the one or more voltage level shifting logic signals received from the engine control computer interface unit; and the output driver operatively is coupled to the current control unit, the output driver configured to variably adjust the signal level of the output terminal based on the current controlled fuel injector control signal.

23. The apparatus of claim 22 wherein the received fuel injector control signal includes one of a 12 volt signal and a zero volt signal, and further, wherein the generated voltage level shifting logic signal includes one of a zero volt signal and a 5 volt signal.

24. The apparatus of claim 22 wherein the output driver is further configured to generate a feedback signal based on the signal level of the output terminal, and to provide the feedback signal to the current control unit.

25. The apparatus of claim 22 wherein the engine control computer interface unit includes:

a buffer; and a resistor operatively coupled to an input terminal of the inverting buffer;

wherein an output terminal of the inverting buffer is operatively coupled to the current control unit.

26. The apparatus of claim 25 wherein the buffer includes an inverting buffer.

27. The apparatus of claim 26 wherein said power supply is operatively coupled to said inverting buffer and said resistor.

28. The apparatus of claim 25 wherein the buffer includes an octal inverting buffer, and further, wherein the resistor includes a 1,000 ohm pull-up resistor.

29. The apparatus of claim 22 wherein said current control unit includes a drive controller configured to generate said output driver signal.

30. The apparatus of claim 17 further including a communication port operatively coupled to the controller, the communication port configured to receive one or more input data.

31. The apparatus of claim 30 wherein the communication port includes an RS 232 port.

32. A method of providing an interface unit for use in a fuel injector engine system, comprising the steps of:

receiving a fuel injector control signal;

generating a current controlled fuel injector control signal corresponding to said received fuel injector control signal using a controller having an engine control computer interface unit, a current control unit and an output driver; and outputting said generated current controlled fuel injector control signal.

* * * * *